United States Patent [19]

Kawa

[11] 3,967,243

[45] June 29, 1976

[54] CHARACTER PATTERN NORMALIZATION METHOD AND APPARATUS FOR OPTICAL CHARACTER RECOGNITION SYSTEM

[75] Inventor: Ryuichi Kawa, Tokyo, Japan

[73] Assignee: Kabushiki Kaisha Ricoh, Tokyo, Japan

[22] Filed: July 5, 1974

[21] Appl. No.: 486,246

[30] Foreign Application Priority Data
July 9, 1973 Japan.............................. 48-77304
Nov. 6, 1973 Japan...................... 48-128208[U]

[52] U.S. Cl. ............... 340/146.3 H; 340/146.3 MA
[51] Int. Cl.² ......................................... G06K 9/12
[58] Field of Search .......... 340/146.3 H, 146.3 AE, 340/146.3 MA, 172.5, 146.3 AH, 146.3 R

[56] References Cited
UNITED STATES PATENTS

| | | |
|---|---|---|
| 3,106,699 | 10/1963 | Kamentsky ................ 340/146.3 H |
| 3,289,164 | 11/1966 | Rabinow ....................... 340/146.3 H |
| 3,624,606 | 11/1971 | LeFevre ..................... 340/146.3 AE |
| 3,760,357 | 9/1973 | Inose et al. .................. 340/146.3 H |
| 3,811,110 | 5/1974 | Inose et al. .................. 340/146.3 H |
| 3,831,146 | 8/1974 | Rundle............................ 340/146.3 H |
| 3,849,760 | 11/1974 | Endou et al. ................. 340/146.3 H |

OTHER PUBLICATIONS

Casey et al., "Parallel Linear Transformations on –Binary Images," *IBM Tech. Disclosure Bulletin*, vol. 13, No. 11, Apr., 1971, pp. 3267–3268.

*Primary Examiner*—Leo H. Boudreau
*Attorney, Agent, or Firm*—Frank J. Jordan

[57] ABSTRACT

The character pattern from the scanner is stored in its original form in an auxiliary memory and in compressed form in a main memory. The slant and the horizontal and vertical second-order moments of the character pattern are sensed in the main memory, and normalized as the character pattern is shifted from the auxiliary memory to the main memory.

17 Claims, 32 Drawing Figures

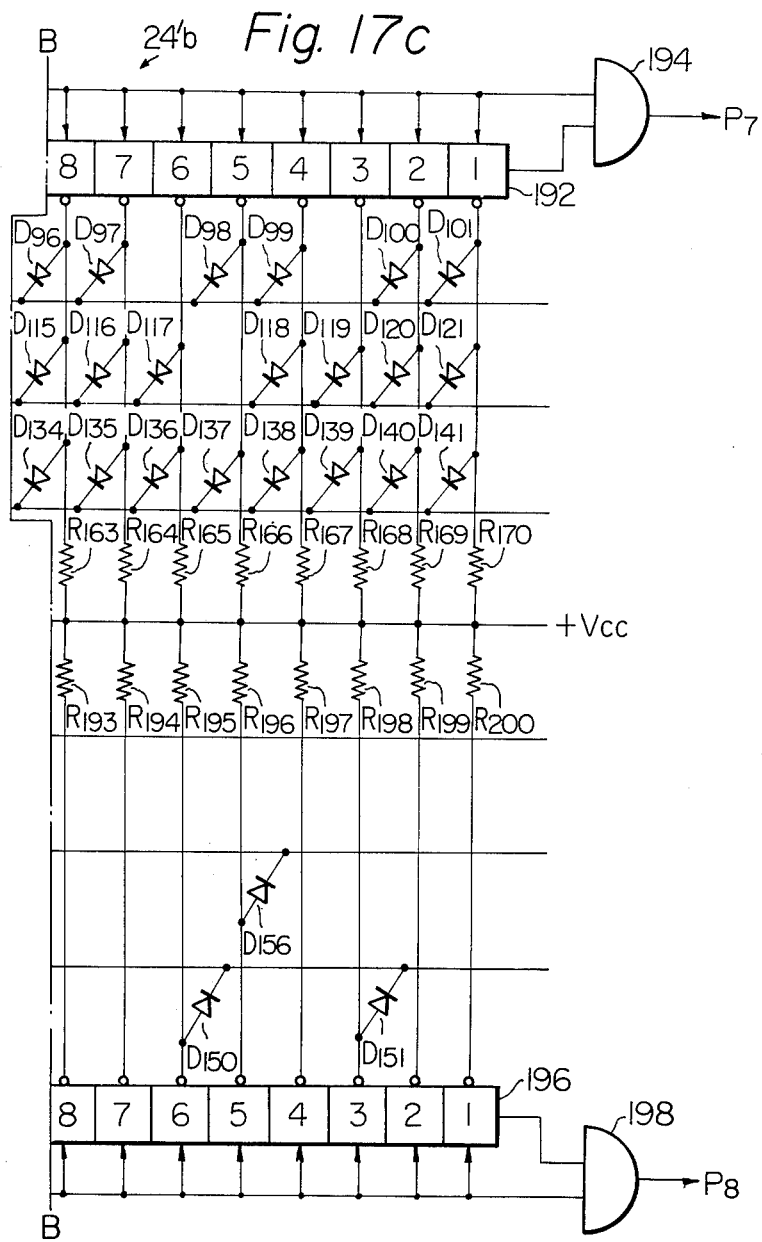

CHARACTER PATTERN NORMALIZATION METHOD AND APPARATUS FOR OPTICAL CHARACTER RECOGNITION SYSTEM

The present invention relates to a character pattern normalization apparatus for an optical character recognition system.

In an optical character recognition system to which the present invention is directed, a document having a character printed thereon either mechanically or by hand is scanned by means of a flying-spot or equivalent scanner is a raster pattern to produce a two-dimensional character pattern constituting a quantized representation of the document. The character pattern is then stored in a memory and compared with known character patterns provided within the system. The character is evaluated or recognized as the known character pattern which it most resembles. The need for improved performance from character recognition systems, especially as input devices for electronic computers, has been increasingly felt in parallel with the improved processing capacity of the computers.

A practical problem in the implementation of an optical character recognition system is that many input characters, especially those printed by hand, differ substantially in form from the known character patterns provided within the system, and if means are not provided for normalizing the character pattern so that the input character will more closely resemble the correct known pattern, the performance of the system will be unsatisfactory, and in the worst cases, the input character will be erroneously recognized as another character. It is generally required, therefore, to normalize the slant, centering, line thickness, contrast and size of the character pattern prior to the recognition process.

Prior art normalization methods include scanning the document once to determine the slant, size, etc. of the character, and then scanning the document a second time in a modified manner adapted to normalize the character to a predetermined standard form. Although good results can be obtained by this method, the apparatus required is complicated and expensive, and the processing time is substantially increased since each document or document section containing a character to be recognized must be scanned twice.

Another prior art normalization method involves scanning the document to provide a character pattern of m rows and n columns, and normalize the pattern using purely digital techniques by which various portions of the character pattern are deleted or supplemented to provide a fixed character pattern of $x$ rows and $y$ columns. This method, however, frequently produces distortions such as voids and blobs which interfere with character recognition.

A particular novel feature of the present invention involves slant normalization. Especially with hand printed characters, writers generally tend to write with a slant to the right or left so that a slant or skew angle $\theta$ is produced between the lines of the character which should be vertical and the vertical axis of the character pattern. In a prior art method of normalizing the slant of the character pattern to reduce the slant angle $\theta$ to zero, the character pattern is stored in a two-dimensional memory which is shiftable in the horizontal direction. Readout devices are connected to the rows of the memory diagonally at the angle $\theta$ with the vertical, so that as the character pattern is shifted through the memory, the character pattern is read out in a normalized manner with the angle $\theta$ equal to zero. In this prior art arrangement, it is obvious that since the readout devices are permanently connected to the memory at the angle $\theta$, only a character with a slant angle equal to $\theta$ will be properly normalized. Also, it is difficult to provide the angle $\Theta$ over a large range.

It is therefore an important object of the present invention to provide a method for normalizing a character pattern which overcomes the drawbacks of the prior art.

It is another important object of the present invention to provide a character pattern normalization apparatus for an optical character recognition system which is effective and fast in operation, and inexpensive to commercially produce compared to prior art apparatus.

It is another important object of the present invention to provide a slant normalization method constituting a part of the above mentioned character pattern normalization method which can be utilized as an improvement to a known character pattern normalization method.

It is yet another important object of the present invention to provide a slant normalization apparatus constituting a part of the above mentioned character pattern normalization apparatus which can be utilized as an improvement to known character pattern normalization apparatus.

The above and other objects, features and advantages of the present invention will become clear from the following detailed description taken in conjunction with the accompanying drawings, in which:

FIGS. 17a to 17c are schematic diagrams of another part of an alternative slant normalization unit to be used with the part shown in FIG. 16.

Figure 1:
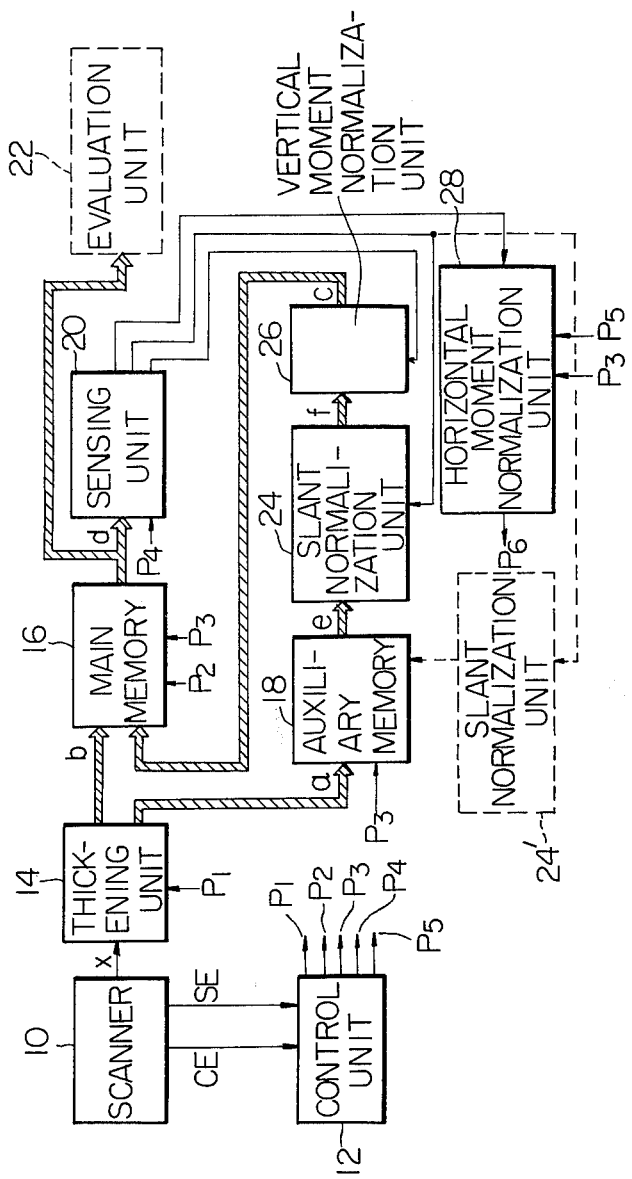
FIG. 1 is a schematic block diagram of an optical character recognition system incorporating a character pattern normalization apparatus or system embodying the present invention.

Referring now to FIG. 1, an optical character recognition system incorporating a character pattern normalization apparatus or system embodying the present invention includes a flying spot or equivalent scanner 10 controlled by a control unit 12. The output of the scanner 10 is connected through a thickening unit 14 to the inputs of a main memory 16 and an auxiliarry memory 18. The auxiliary memory 18 is in matrix form and is composed of $2m$ shift registers, each shift register having $2n$ bits or stages. The shift registers are shiftable together in parallel in the horizontal direction. The main memory 16 is composed of m shift registers, each shift register having n bits or stages. The shift registers of the main memory 16 are also shiftable together in parallel in the horizontal direction. For the purpose of simplicity of description and illustration, $m$ and $n$ will be assumed as having the values 10 and 9 respectively, although in an actual application the values of $m$ and $n$ might be 33 and 30 respectively.

A sensing unit 20 has sensing inputs connected to a plurality of points in the main memory 16 as will be described in detail below. The output of the main memory 16 is connected to an evalutaion unit 22, which is arranged to compare a character pattern transferred thereto from the main memory 16 with a plurality of known character patterns stored therein and recognize the input character as the known character which it most resembles. Since the evaluation unit 22 is known in the art and does not constitute a novel feature of the present invention, a detailed description thereof will be omitted.

The output of the auxiliary memory 18 is connected through a slant normalization unit 24 and a vertical normalization unit 26 to the input of the main memory 16. The sensing unit 20 produces three outputs which are connected to control the slant normalization unit 24, the vertical normalization unit 26 and a horizontal normalization unit 28 respectively. An output of the horizontal normalization unit 28 carrying shift pulses P6 is connected to the shift input of the main memory 16. Designated as 24' is an alternative slant normalization unit having an input adapted to receive the respective output of the sensing unit 20 and an output connected to the shift inputs of the auxiliary memory 18 as will be described in detail below. Either one of the slant normalization unnits 24 and 24' may be utilized within the scope of the invention, but not both together.

Figure 2:
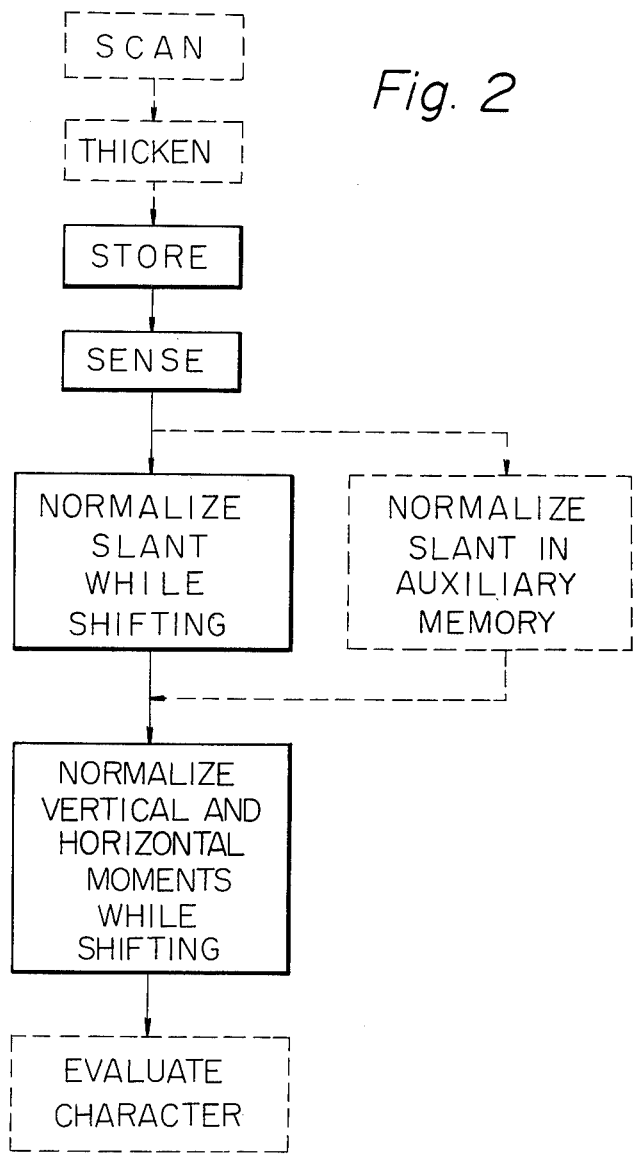
FIG. 2 is a flow chart illustrating the method underlying the system shown in FIG. 1.
Figure 3:
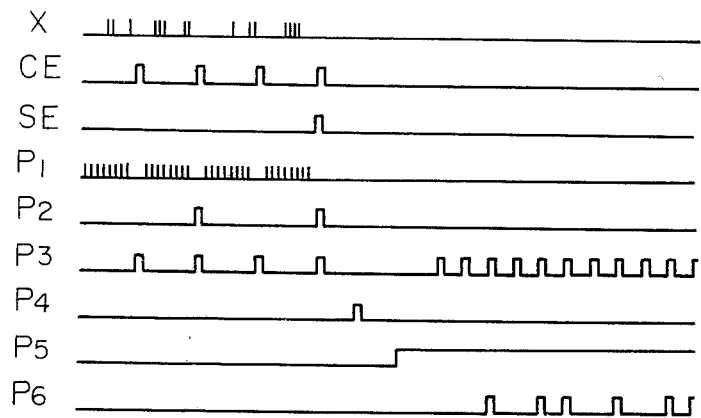
FIG. 3 is a timing chart of control signals utilized in the system shown in FIG. 1.

The operation of the system of FIG. 1 will now be described with reference also being made to FIGS. 2 and 3. The scanner 10 is arranged to scan a document on which a characet (not shown) is printed either mechanically or by hand in a raster pattern with the main scan being from top to bottom and the side scan being from right to left. The scanner 20 comprises a quantizer (not shown) to quantize the main scan into $2m$ or 20 bits or rows and the side scan into $2n$ or 18 bits or columns. The scanner 10 produces a positive pulse orr logical "1" when the bit being scanned represents a point on the character and no pulse or logical "0" when the bit being scanned represents a point on the background of the document. The scanner 10 is further operative to generate and feed to the control unnit 12 a completion of main scan signal CE at the end of each main scan or vertical sweep and a completion of character scan signal SE when the entire document has been scanned. In synchronism with the main scan of the scanner 10, the control unit 12 feeds shift pulses P1 to the thickening unit 14. The thickening unit 14 comprises two shift registers connected in series, as will be described in detail below, each shift register having a capacity of $2m$ or 20 bits so that the two shift registers in combination are able to accumulate and store 2 columns of the character pattern produced by the scanner 10. It will be understood that electrical signals produced at the output of the scanner 10 and fed into the input of the thickening unit 14 constitute a character pattern which is a quantized representation of the document. The stages of the shift registers of the thickening unit 14 are connected to corresponding row inputs of the memories 16 and 18 so that as each two columns of the character pattern is accumulated in the thickening unit 14 the control unit 12 generates a main memory shift pulse P2 to shift the main memory 16 so that one column of the character pattern is stored in the main memory 16. similarly, as each one column is accumulated in the thickening unit 14, the control unit generates an auxiliary memory shift pulse P3 to shift the auxiliary memory 18 so that one column of the characeter pattern is stored in the auxiliary memory 18. The thickening unit 14 is arranged to uniformly thicken the line thickness of the character pattern by one bit both horizontally and vertically, and may be replaced by a serial-to-parallel converter which does not thicken the line thickness of the character pattern if desired. When the end of character scan signnal SE is generated by the scanner 10, the character pattern has been stored in the auxiliary memory 18 in the as-scanned format of $2m$ rows by $2n$ columns, and in the main memory 16 in a compressed format of $m$ rows by $n$ columns. Within the scope of the present invention, the memories 16 and 18 may alternatively have the same row and column capacity, or the row and column capacity of the main memory 16 may be smaller than the row and column capacity of the auxiliary memory 18 by a factor other than 2.

After receiving the end of character scan signal SE, the control unit 12 feeds a sensing pulse P4 to the sensing unit 20. The sensing unit 20 then senses the slant or skew, and the vertical and horizontal second-order moments of the character pattern about horizontal and vertical axes respectively intersecting at the centroid of the character pattern, and feeds signals representing the sensed values to the slant normalization unit 24, the vertical normalization unit 26 and the horizontal normalization unit 28 respectively. Subsequently, a positive signal P5 is fed from the control unit 12 to the horizontal normalization unit 28 to enable the same. The horizontal normalization unit 28 receives the auxiliary memory shift pulses P3 and generates the shift pulses p6 which are fed to the main memory 16 to shift the same. The auxiliary and main memories 18 and 16 are shifted over a predetermined time period by the shift pulses P3 and P6 respectively so that the character pattern is transferred from the auxiliary memory 18 into the main memory 16. As the character pattern passes through the slant normalization unit 24 and the vertical normalization unit 26, the slant and vertical second-order moment of the character pattern are normalized to predetermined values in accordance with the output signals of the sensing unit 20. The relationship between the frequencies of the shift pulses P3 and P6 is such that the horizontal second-order moment of the character pattern is normalized to a predetermined value in accordance with the respective output signal from the sensing unit 20 while being shifted through the main memory 16 to its final position. In the alternative embodiment utilizing the slant normalization unit 24' rather than the slant normalization unit 24, the slant of the character pattern is normalized within the auxiliary memory 18 before the character pattern is shifted into the main memory 16 in accordance with the respective output signal from the sensing unit 20. It will be understood that the normalized character pattern shifted into the main memory 16 from the auxiliary memory 18 will replace the original contents of the main memory 16. After the normalization process is completed, the character pattern is shifted from the main memory 16 into the evaluation unit 22 to be recognized.

Figure 4:
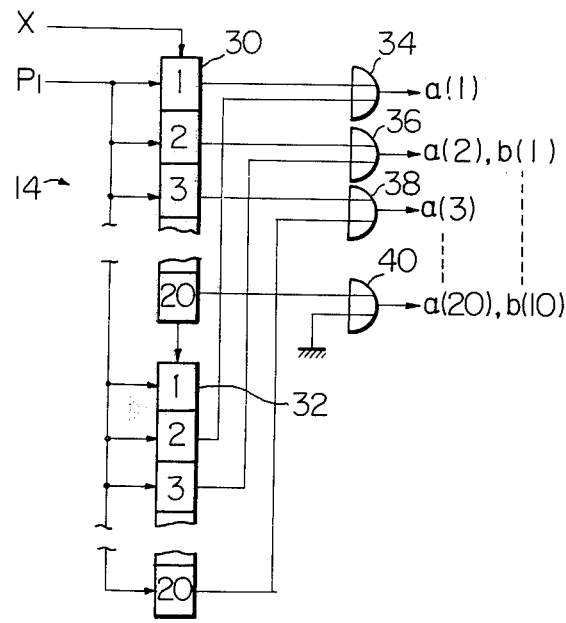
FIG. 4 is a schematic diagram of a thickening unit shown in FIG. 1.

Referring now to FIG. 4, the thickening unit 14 comprises two shift registers 30 and 32 connected in series, each having $2m$ or 20 stages. The output X of the scanner 10 is applied to the first stage input of the shift register 30, and the shift pulses P1 are applied to the shift inputs of both shift registers 30 and 32. As mentioned above, the shift registers 30 and 32 in combination are arranged to accumulate and store 2 columns of the character pattern at a time. $2m$ or 20 OR gates are provided which have inputs connected respectively to a stage $(i)$ of the shift register 30 and a stage $(i + 1)$ of the shift register 32. Only 4 of the OR gates are shown for simplicity of illustration, and are designated as 34, 36, 38 and 40. Each OR gate will produce an output when either of its inputs $(i)$ or $(i + 1)$ representing diagonally adjacent points in the character pattern represents a point on the character. The outputs of the OR gates are designated as $a(1)$ to $a(20)$, and are connected respectively to the inputs of the auxiliary memory 18. Every second output $a(2)$ to $a(20)$ is also designated as $b(1)$ to $b(10)$, and connected to the inputs of the main memory 16. In this manner, the character pattern has its line thickness uniformly thickened and is stored in the auxiliary memory 18 in the as-scanned format and in the main memory 16 in a format compressed linearly by a factor of 2 by the thickening unit 14.

Figure 5:
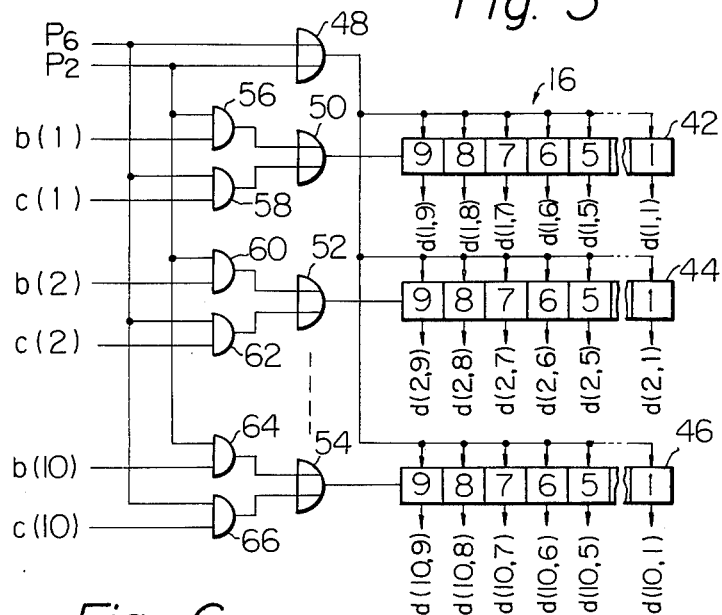
FIG. 5 is a schematic diagram of a main memory shown in FIG. 1.

Referring now to FIG. 5, the main memory 16 comprises $m$ or 10 shift registers each having $n$ or 9 stages, only 3 shift registers being shown for simplicity of illustration and designated as 42, 44 and 46 representing the 1st, 2nd and 10th rows respectively. The output of an OR gate 48 is connected to the shift inputs of the shift registers, and the OR gate 48 has 2 inputs which are connected to receive the shift pulses P2 and P6 respectively. The signal inputs of the leftmost stages of the shift registers 42, 44 and 46 are connected to the outputs of OR gates 50, 52 and 54, and OR gate being provided for each shift register of the main memory 16 and being associated with the rows 1 to 10 respectively. Inputs of the OR gates 50, 52 and 54 are connected to outputs of AND gates 56, 60 and 64 respectively. First inputs of the AND gates 56, 60 and 64 are connected to receive the pulses P2, and second inputs are connected to the outputs $b(1)$, $b(2)$ and $b(10)$ of the thickening unit 14 respectively. Second inputs of the OR gates 50, 52 and 54 are connected to outputs of AND gates 58, 62 and 66 respectively. First inputs of the AND gates 58, 62 and 66 are connected to receive the pulses P6, and second inputs are connected to outputs $c(1)$, $c(2)$ and $c(10)$ respectively of the vertical normalization unit 26. In operation, either one of the pulses P2 and P6, whichever is present, will shift all of the shift registers of the main memory 16 from left to right. When the character pattern is being transferred from the thickening unit 14 into the main memory 16, the pulses P2 at the inputs of the AND gates 56, 60 and 64 will enable the same, so that the outputs $b(1)$, $b(2)$ and $b(10)$ will be gated to the signal inputs of the shift registers 42, 44 and 46 through the AND gates 56, 60 and 64 and the OR gates 50, 52 and 54 respectively. When the character pattern is being transferred from the auxiliary memory 18 into the main memory 16 through the vertical normalization unit 26, the pulses P6 at the inputs of the AND gates 58, 62 and 66 will enable the same, so that the outputs $c(1)$, $c(2)$ and $c(10)$ will be gated to the shift registers 42, 44 and 46 through the AND gates 58, 62 and 66 and the OR gates 50, 52 and 54 respectively. The outputs of the stages of the shift registers of the main memory 16 are designated as $d(1, 1)$ to $d(10, 9)$ respectively.

Figure 6:
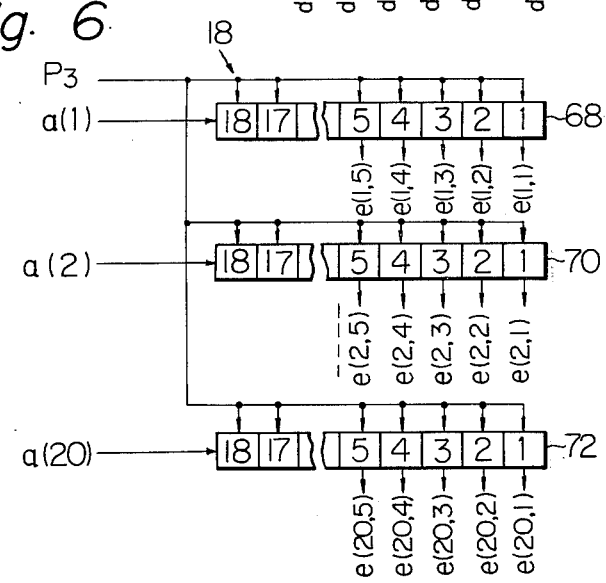
FIG. 6 is a schematic diagram of an auxiliary memory shown in FIG. 1.

Referring now to FIG. 6, the auxiliary memory 18 comprises $2m$ or 20 shift registers, each having $2n$ or 18 stages, only 3 being shown for simplicity of illustration and designated as 68, 70 and 72 representing the 1st, 2nd and 20th rows respectively. The shift inputs of the shift registers of the auxiliary memory 18 are connected to receive the shift pulses P3, and the signal inputs of the leftmost stages of the shift registers 68, 70 and 72 are connected to the outputs $a(1)$, $a(2)$ and $a(20)$ of the thickening unit 14. In operation, all of the shift registers of the auxiliary memory 18 shift from left to right in response to the shift pulses P3 so that the character pattern is shifted from left to right through the auxiliary memory 18. The outputs of the rightmost 5 stages of the shift registers are connected to the slant normalization unit 24 and are designated as $e(1, 1$ to $5)$ to $e(20, 1$ to $5)$.

Figure 7:
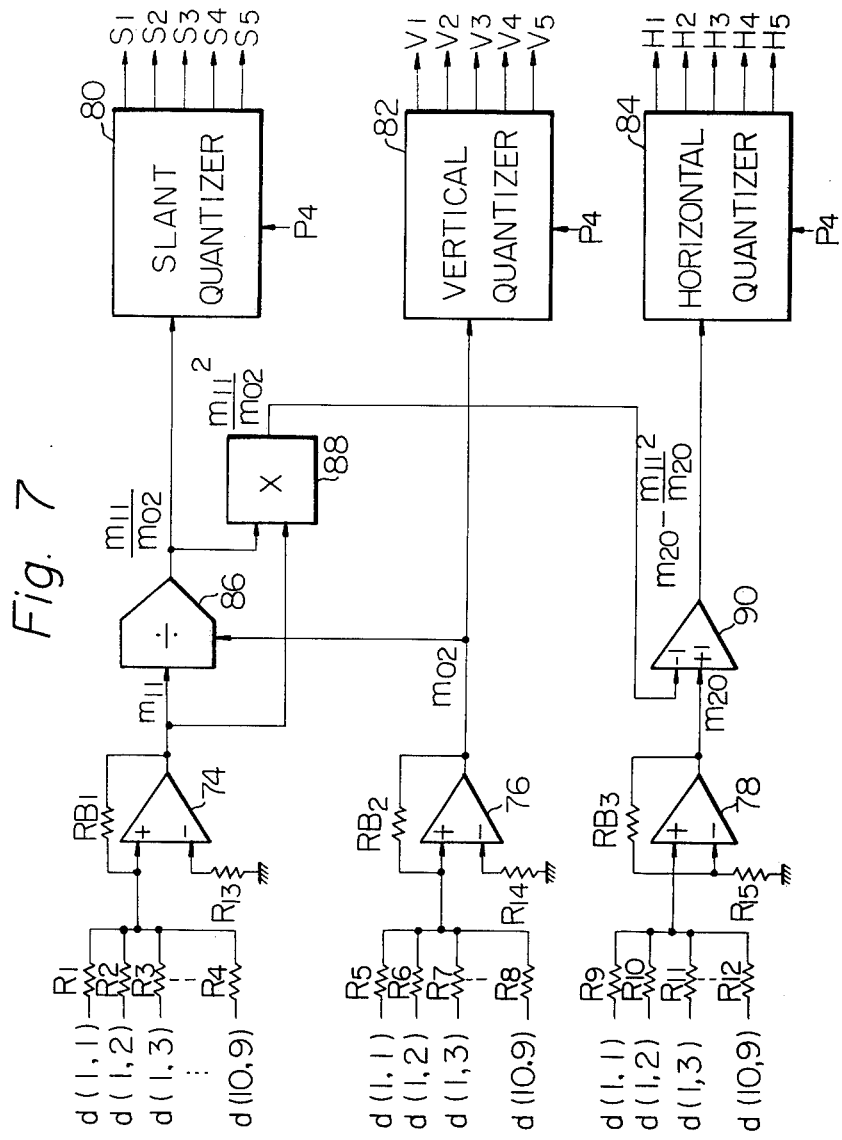
FIG. 7 is a schematic diagram of a sensing unit shown in FIG. 1.

An example of the sensing unit 20 is shown in FIG. 7, and comprises a resistor weighting network consisting of 270 resistors, only 12 being shown and designated as R1 to R12. The 90 resistors represented by the resistors R1 to R4 have one end connected to a respective output $d(1, 1)$ to $d(10, 9)$ of the main memory 16 and the other end commonly connected to a positive input of an operational amplifier 74. The 90 resistors represented by the resistors R5 to R8 have one end connected to a respective output $d(1, 1)$ to $d(10, 9)$ of the main memory 16 and the other end commonly connected to a positive input of an operational amplifier 76. The 90 resistors represented by the resistors R9 to R12 are similarly connected to the main memory 16 and a positive input of an operational amplifier 78. The operational amplifiers 74, 76 and 78 have negative inputs grounded through resistors R13, R14 and R15 and are provided with feedback resistors RB1, RB2 and RB3 respectively.

The operational amplifier 74 is adapted to compute the slant or product moment of the character pattern in the main memory 16 weighted by the 90 resistors represented by the resistors R1 to R4. It will be understood that the positive input of the operational amplifer 74 is connected to each output stage $d(1, 1)$ to $d(10, 9)$ of the main memory 16 through a resistor to sense every point of the character pattern. If desired, although not shown, a sampler may be provided so that only selected outputs $d(1, 1)$ to $d(10, 9)$ of the main memory 16 are sensed to reduce the number of connections between the main memory 16 and the sensing unit 20.

The slant $M_{11}$ or skew of the character pattern may be represented by the following product moment relation $$M_{11} = \sum_{j=1}^{n} \sum_{i=1}^{m} (i - \frac{m}{2})(j - \frac{n}{2}) d(i,j) \quad (1)$$

and appears at the output of the operational amplifier 74. Similarly, the vertical second-order moment $M_{02}$ and the horizontal second-order moment $M_{20}$ of the character pattern may be represented as $$M_{02} = \sum_{j=1}^{n} \sum_{i=1}^{m} (i - \frac{m}{2})^2 d(i,j) \quad (2)$$

$$M_{20} = \sum_{j=1}^{n} \sum_{i=1}^{m} (j - \frac{n}{2})^2 d(i,j) \quad (3)$$

and appear at the outputs of the operational amplifiers 76 and 78 respectively.

Preferred functions of the moments $M_{11}$, $M_{02}$ and $M_{20}$ are applied to the inputs of a slant quantizer 80, a vertical quantizer 82 and a horizontal quantizer 84. It is well known in the art that the moments $M_{02}$ and $M_{20}$ represent the size or vertical and horizontal spatial distribution of the character pattern, but if desired, other spatial parameters of the character pattern may be used for this purpose.

The output $M_{11}$ of the operational amplifier 74 is applied to an input of a divider 86, the other input of which is connected to the output $M_{02}$ of the operational amplifier 76. The output $M_{02}$ of the operational amplifier 76 is also connected directly to the input of the vertical quantizer 82. The output $M_{11}/M_{02}$ of the divider 86 is connected to the input of the slant quantizer 80 and also to an input of a multiplier 88. The other input of the multiplier 88 is connected to the output $M_{11}$ of the operational amplifier 74, and the output $M_{11}^2/M_{02}$ of the multiplier 88 is applied to a negative input of an adder 90. The positive input of the adder 90 is connected to the output $M_{20}$ of the operational amplifier 78, and the output $M_{20} - M_{11}^2/M_{20}$ is applied to the input of the horizontal quantizer 84. The quantizers 80, 82 and 84 are also connected to receive the pulse signal P4, and produce outputs S1 to S5, V1 to V5 and H1 to H5 respectively. These outputs represent the sub-ranges of the ranges of the respective input signals.

The output S3 represents zero slant, the output S2 represents leftward or counterclockwise slant and the output S1 represents greater leftward slant. The output S4 represents rightward or clockwise slant, and the output S5 represents greater rightward slant. The output V3 represents a predetermined normal vertical second-order moment, the output V2 excessive vertical second-order moment and the output V1 represents even more excessive vertical second-order moment. The output V4 represents insufficient vertical second-order moment and the output V5 represents even more insufficient vertical second-order moment. The output H3 represents a predetermined normal horizontal second-order moment, the output H2 represents excessive horizontal second-order moment and the output H1 represents even more excessive horizontal second-order moment. The output V4 represents insufficient horizontal second-order moment and the output V5 represents even more insufficient horizontal second-order moment. It will be understood that the funcitons of the moments $M_{11}$, $M_{02}$ and $M_{20}$ applied to the inputs of the quantizers 74, 76 and 78 are exemplary only, and that the quantizers 74, 76 and 78 may be adapted to produce more or less than 5 outputs each; for example 3 or 7 outputs each as desired.

Figure 8:
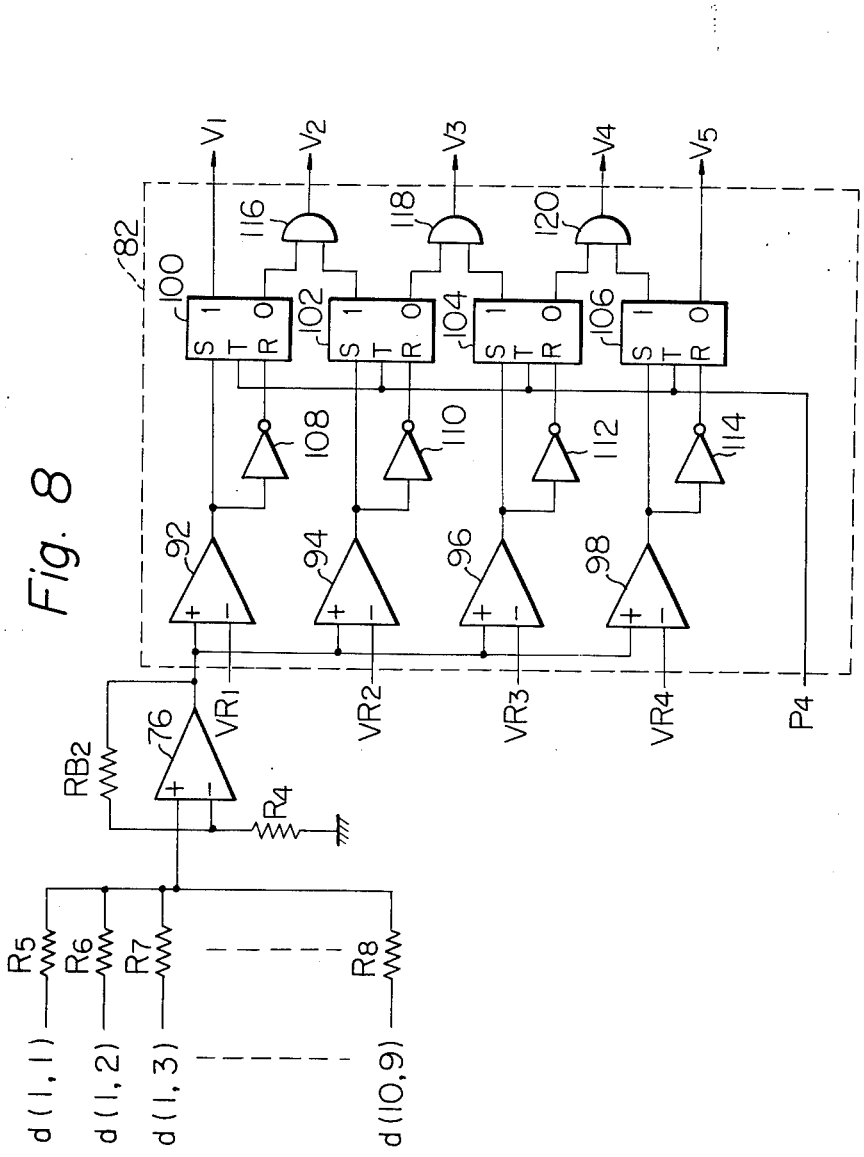
FIG. 8 is a more detailed schematic diagram of a portion of the sensing unit shown in FIG. 7.

FIG. 8 shows an exemplary embodiment of the quantizer 82. The quantizers 80 and 84 are essentially similar in construction and function to the quantizer 82, and are not shown in detail for simplicity of illustration. The quantizer 82 as shown comprises comparators 92, 94, 96 and 98, each having a positive input connected to the output of the operational amplifier 76. Reference voltages VR1, VR2, VR3 and VR4 are applied to negative inputs of the comparators 92, 94, 96 and 98 respectively, the voltage VR1 having the highest magnitude and the voltage VR4 having the lowest magnitude.

The outputs of the comparators 92, 94, 96 and 98 are connected directly to the set inputs S of flip-flops 100, 102, 104 and 106, and to the reset inputs R thereof through inverters 108, 110, 112 and 114. The sensing pulse P4 is applied to the read-in inputs T of all of the flip-flops 100, 102, 104 and 106. The output V1 is taken as the logical "1" output of the flip-flop 100, and the output V5 is taken as the logical "0" output of the flip-flop 106. The inputs of an AND gate 116 are connected to the logical "0" output of the flip-flop 100 and to the logical "1" output of the flip-flop 102, and the output V2 is taken as the output of the AND gate 116. Inputs of an AND gate 118 are connected to the logical "0" output of the flip-flop 102 and to the logical "1" output of the flip-flop 104, and the output V3 is taken as the output of the AND gate 118. Inputs of an AND gate 120 are connected to the logical "0" output of the flip-flop 104 and to the logical "1" output of the flip-flop 106, and the output V4 is taken as the output of the AND gate 120. Only one output V1 to V5 is produced at a given time.

In operation, when the output of the operational amplifier 76 has a magnitude greater than the reference voltage VR1, all of the comparators 92, 94, 96 and 98 will produce a logical "1" output, so that a logical "1" signal is applied to the set inputs S of the flip-flops 100, 102, 104 and 106 and a logical "0" signal is applied ot the reset inputs R thereof. When the sensing pulse P4 is received at the read-in inputs T, the logical "1" outputs of all of the flip-flops 100, 102, 104 and 106 will become logical "1" and all of the logical "0" outputs thereof will become logical "0". In this case, only the output V1 will be produced, because one input to all of the AND gates 116, 118 and 120 is logical "0", and the logical "0" output of the flip-flop 106 is logical "0". When the output of the operational amplifier 76 has a magnitude less than that of the reference voltage VR4, the outputs of all of the comparators 92, 94, 96 and 98 will be logical "0", the logical "1" outputs of all of the flip-flops 100, 102, 104 and 106 will be logical "0" and the logical "0" outputs thereof will be logical "1". In this case, only the output V5 will be produced since all of the AND gates 116, 118 and 120 have one logical "0" input and the logical "1" output of the flip-flop 100 is logical "0".

When the output of the comparator 76 has a magnitude between the reference voltages VR1 and VR2, the logical "1" output of the flip-flop 100 is logical "0" and the logical "0" output thereof is logical "1". The logical "1" outputs of all of the flip-flops 102, 104 and 106 will be logical "1" and the logical "0" outputs thereof will be logical "0". In this case, only the output V2 will be produced since only the AND gate 116 will have two logical "1" inputs, the logical "1" output of the flip-flop 100 is logical "0" and the logical "0" output of the flip-flop 106 is logical "0". In a similar manner, the outputs VV3 and V4 will be produced when the magnitude of the output of the comparator 76 is between the reference voltages VR2 and VR3, and between VR3 and VR4 respectively.

Figure 9A:
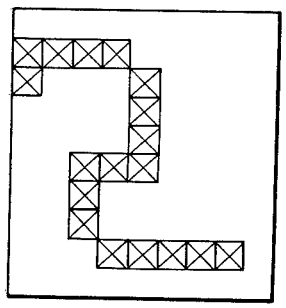
FIGS. 9a and 9b are graphic representations illustrating a slant normalization method according to the present invention.
Figure 9B:
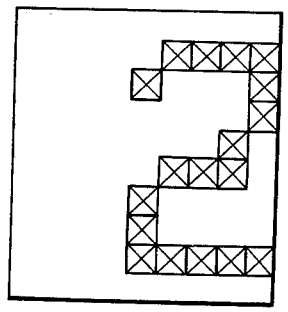

It has been determined experimentally that hand-printed characters generally have satisfactory parallelism in the horizontal direction, and it is generally sufficient to normalize the slant or skew of the character pattern rather than the rotation thereof. Although means for normalizing the rotation of the character pattern may be added to a system embodying the present invention, such means do not constitute a novel feature of the invention. The method of normalizing the slant of the character pattern is illustrated in FIG. 9, wherein FIG. 9a shows the character "2" slanted leftwise or counterclockwise, and FIG. 9b shows the same character "2" after normalization. The top two rows of the character pattern during the normalization process are shifted rightward by five steps and the bottom or 5th two rows are shifted rightward by only one step. The 2nd, 3rd and 4th two rows are shifted to the right by 2, 3 and 4 steps respectively. In this manner, leftward slant is normalized. Rightward slant is normalized by shifting the bottom two rows rightward by 5 steps and the upper rows by progressively decreasing numbers of steps so that the upper two rows are shifted rightward by only one step. The degree of slant normalization can be varied by changing the degree of shift of the top of the character pattern relative to the bottom thereof.

Figure 10:
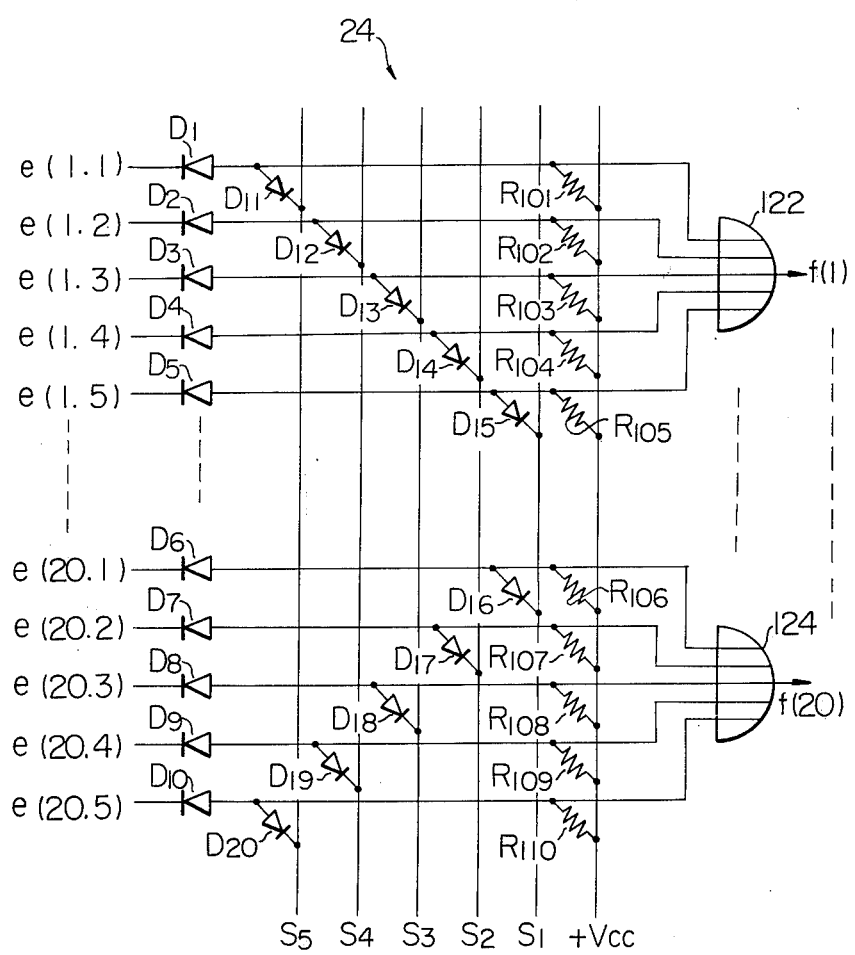
FIG. 10 is a schematic diagram of a slant normalizing unit shown in FIG. 1.

FIG. 10 illustrates an example of the slant normalization unit 24, in which the principle of shifting the top of the character pattern relative to the bottom is maintained, but in which the top of the character pattern is shifted rightward and the bottom shifted leftward or vice-versa. The slant normalization unit 24 comprises $2m$ or 20 OR gates, only 2 of which are shown for simplicity of illustration and designated as 122 and 124, the outputs thereof being designated as $f(1)$ to $f(20)$ and connected to the inputs of the vertical normalization unit 26. Each OR gate has five inputs connected to the anodes of five diodes respectively, the cathodes of the diodes being connected to five stages respectively in a row of the auxiliary memory 18. For example, the outputs $e(1, 1$ to $5)$ of row 1 of the auxiliary memory 18 are connected through diodes D1 to D5 to the inputs of the OR gate 122, and the outputs $e(20, 1$ to $5)$ of row 20 are connected through diodes D6 to D10 to the inputs of the OR gate 124. A supply voltage +Vcc is applied through resistors R101 to R110 to the anodes of the diodes D1 to D10 respectively. The outputs S1 to S5 of the sensing unit 20 are applied to the cathodes of diodes D15 to D11 respectively and to the cathodes of diodes D16 to D20 respectively. The anodes of the diodes D11 to D20 are connected to the anodes of the diodes D1 to D10 respectively. The diodes D1 and D11 and the resistor R101 constitute an AND gate associated with the output $e(1, 1)$, as do the diodes D2 and D12 and the resistor R102 associated with the output $e(1, 2)$, etc.

In operation, the outputs of column 3 $e(1$ to $20, 3)$ of the auxiliary memory 18 constitute a reference column. In response to a signal from the output S3 representing zero slant, the diodes D13 and D18 and the other 18 diodes corresponding to the outputs $e(2$ to $19, 3)$ (not shown) are reverse biased (the respective AND gates enabled) so that the outputs $e(1$ to $20, 3)$ are applied to the inputs of the 20 or OR gates represented by the OR gates 122 and 124 respectively. In this case, the character pattern is not shifted.

In response to the maximum leftward slant signal from the output S1, the diodes D15 and D16 will be reverse biased so that the output $e(20, 1)$, or the rightmost output of row 20 of the auxiliary memory 18 is applied to the input of the OR gate 124 and the output $e(1, 5)$, or the output of the fifth stage from the right of row 1 of the auxiliary memory 18 is applied to the input of the OR gate 122. In this case, the contents of the stage or point at the output $e(20, 1)$ will be gated two steps or stages leftward to the reference position $e(20, 3)$ in the bottom row, and the contents of the stage having the output $e(1, 5)$ will be gated two steps rightward to the reference position $e(1, 3)$ in the top row. The net effect is that the top row is shifted 4 steps rightward with respect to the bottom row, so that the character pattern is skewed rightward to normalize the leftward or counterclockwise slant. Although not shown, the diode AND gates for rows 2 to 19 are connected so that rows 2 to 19 will be progressively shifted to an intermediate extent between rows 1 and 20 to produce the net effect illustrated in FIG. 9. As the character pattern is shifted through the slant normalization unit 24, the above described operation is sequentially repeated for each column of the character pattern to skew the entire character pattern as desired.

In response to the output S5 representing maximum rightward slant, the diodes D11 and D20 are reverse biased so that the output $e(1, 1)$ is applied to the input of the OR gate 122 and the output $e(20, 5)$ is applied to the input of the OR gate 124. The effect is opposite to that produced by the output S1, in that the content of the stage output $e(1, 1)$ is gated two steps leftward to the position of $e(1, 3)$ and the output $e(20, 5)$ is gated two steps rightward to the position of $e(20, 3)$ so that the top row of the character pattern is shifted 4 steps leftward with respect to the bottom row to skew the character pattern leftward and correct for maximum rightward slant. In response to the output S2, the top row is shifted 2 steps rightward relative to the bottom row, and in response to the output S4 the top row is shifted 2 steps leftward relative to the bottom row in a manner essentially similar to that described above with respect to the outputs S1 and S5.

Figure 11:
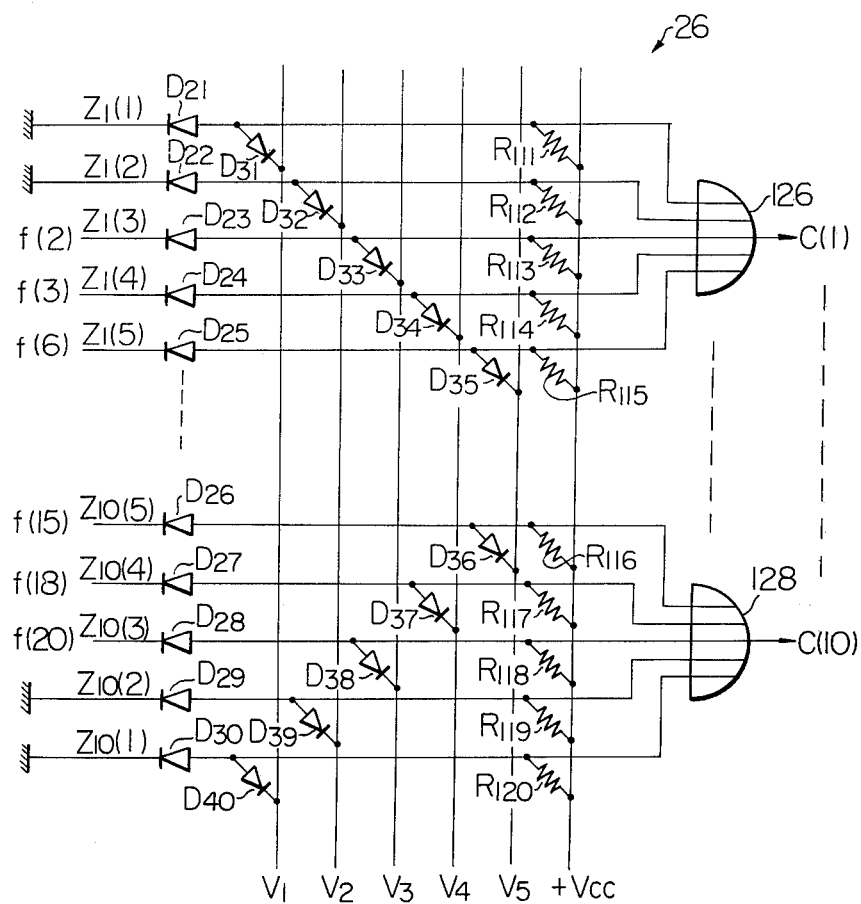
FIG. 11 is a schematic diagram of a vertical normalization unit shown in FIG. 1.

The vertical normalization unit 26 is shown in FIG. 11, and comprises 10 OR gates, only 2 of which are shown and designated as 126 and 128. The outputs of the 10 OR gates constitute the outputs $c(1)$ to $c(10)$ of the vertical normalization unit 26 which are connected to the inputs of the main memory 16 (see FIG 5). Each OR gate has 5 inputs which are connected through 5 diodes respectively to 5 inputs of the vvertical normalization unit 26. As shown, the anodes of diodes D21 to D25 are connected to inputs of the OR gate 126 and the cathodes thereof are connected to inputs Z1(1 to 5) respectively of the vertical normalization unit 26. Similarly, the anodes of diodes D30 to D26 are connected to inputs of the OR gate 128, and the cathodes thereof are connected to inputs Z10(1 to 5) of the vertical normalization unit 26 respectively. The anodes of the diodes D21 to D30 are connected to the +Vcc supply voltage through resistors R111 to R120 respectively. The outputs V1 to V5 of the sensing unit 20 are applied to the cathodes of diodes D31 to D35, the anodes of which are connected to the anodes of the diodes D21 to D25 respectively. The outputs V1 to V5 are also connected to the cathodes of diodes D40 to D36, the cathodes of which are connected to the anodes of the diodes D30 to D26 respectively. As shown, the inputs Z1(1), Z1(2), Z10(1) and Z10(2) are connected to ground. The inputs Z1(3 to 5) are connected to the outputs $f(2)$, $f(3)$ and $f(6)$ of the slant normalization unit 24 respectively. The inputs Z10(3 to 5) are connected to the outputs $f(20)$, $f(18)$ and $f(15)$ of the slant normalization unit 24 respectively. The diodes D21, D31 and resistor R111 constitute an AND gate as in the slant normalization unit 24.

Figure 12:
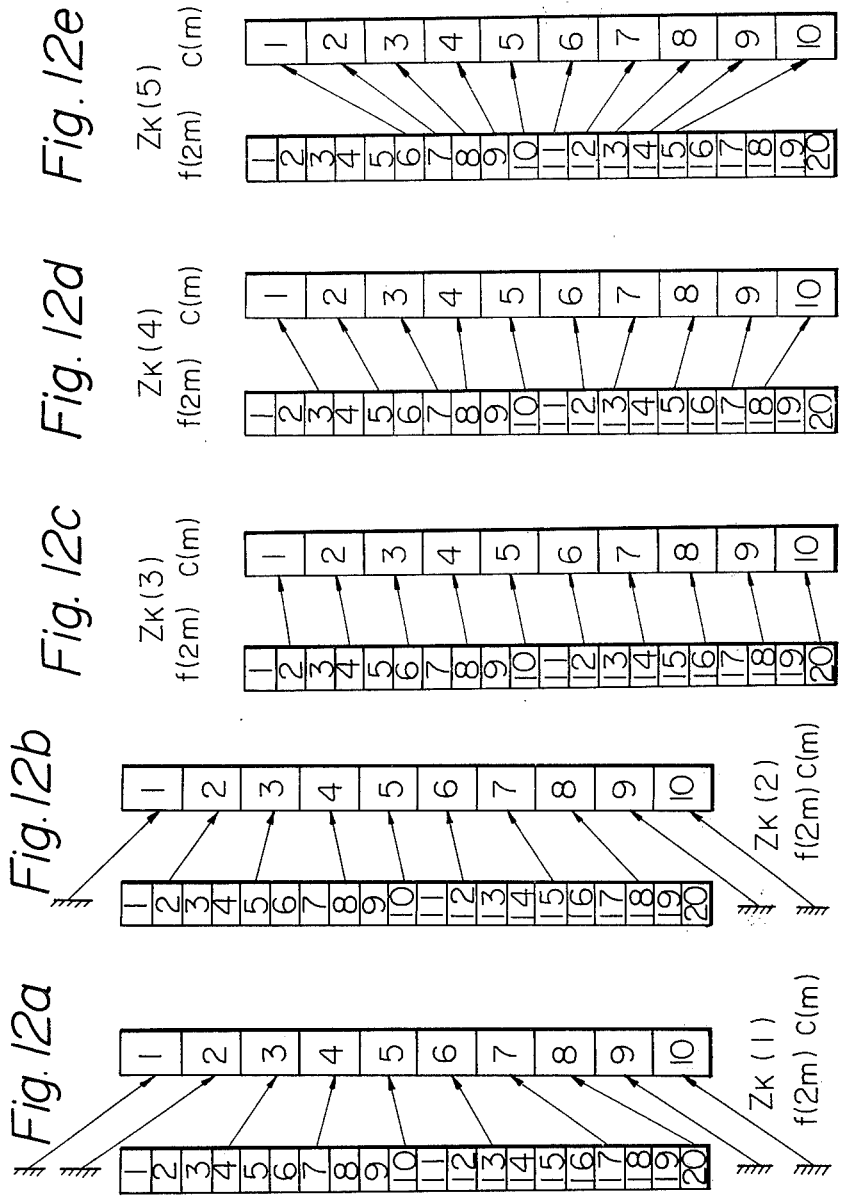
FIGS. 12a to 12e are schematic diagrams illustrating the connections between the slant normalization unit shown in FIG. 10 and the vertical normalization unit shown in FIG. 11.

Although not shown in FIG. 11, the connections and functions of the OR gates having the outputs $c(2$ to $9)$ are indicated in FIG. 12. It will be noticed that the number of inputs $f(1$ to $20)$ to the vertical normalization unit 26 is equal to the number or rows (2m or 20) of the auxiliary memory 18, and the number of outputs $c(1$ to $10)$ is equal to the number of rows ($m$ or 10) of the main memory 16 to provide a vertical compression factor of two when the vertical second-order moment of the character pattern is normal. In FIG. 12, the five sets of columns represent the five inputs to each OR gate of the vertical normalization unit 26 as gated to the output thereof in response to the outputs V1 to V5 of the sensing unit 20 respectively. The designation Zk(1) indicates the case of the output V1 in which $k$ has the value of 1 to 10, corresponding to the number of the associated output $c(1$ to 10). For example, Z10(1) indicates the first, or V1 input to the OR gate 128, which is shown in FIG. 11. The designations Zk(2) to Zk(5) correspond to the outputs V2 to V5 respectively. Each column designated as $f$ represents the inputs $f(1)$ to $f(20)$ of the vertical normalization unit 26 and the columns designated as $c$ represent the outputs $c(1)$ to $c(10)$ thereof. In the example shown, the OR gate 126 produces the output $c(1)$, and the inputs Z1(1 to 5) are connected to ground, ground, $f(2)$, $f(3)$ and $f(6)$ respectively. The NAND gates 134, 136, 138, 140 and 142, diodes D41 to D76 and resistors R121 to R138 in combination constitute an encoder.

In response to the output V3 indicating normal vertical moment, the diodes D33 and D38 are reverse biased so that the input Z1(3), which is the output $f(2)$, is gated to the output $c1$ through the OR gate 126, as shown in FIG. 12c. Also, the input Z10(3), which is the output $f(20)$, is gated to the output $c(10)$ through the OR gate 128. The outputs $f(4, 6, 8, 10, 12, 14, 16$ and $18)$ are gated to the outputs $c(2, 3, 4, 5, 6, 7, 8$ and $9)$ respectively so that the character pattern is uniformly vertically compressed by a factor of 2.

In response to the output V1 from the sensing unit 20 representing maximum excessive vertical moment, the diodes D31 and D40 are reverse biased so that the input Z1(1), which is ground, is gated to the output $c(1)$ and the input Z10(1), which is also ground, is gated to the output $c(10)$. As shown in FIG. 12a, the inputs $f(4, 7, 10, 13, 16$ and $20)$ are gated to the outputs $c(3, 4, 5, 6, 7$ and $8)$ respectively so that the vertical second-order moment of the character pattern is reduced to a maximum extent. It will be noticed that the as-scanned character pattern only occupies a vertical range of about 2½ to 8 out of a possible range of 1 to 10 at the output of the vertical normalization unit in the case of the output V1, since points in the upper portion of the character pattern have been shifted vertically downward and points in the lower portion have been shifted vertically upward. The exemplary connections shown in FIG. 12 do not necessarily represent a design choice within the scope of the invention, but were chosen to clearly show the operating principles thereof.

In response to the output V5 of the sensing unit 20, the diodes D35 and D36 will be reverse biased so that the inputs Z1(5) or $f(6)$ and Z10(5) or $f(15)$ are gated to the outputs $c(1)$ and $c(10)$ respectively. The character pattern will be expanded as shown in FIG. 12e to normalize the insufficient vertical second-order moment to a maximum extent. The portion of the character pattern within a vertical range of 6 to 15 out of a possible 1 to 20 will be expanded to fill the entire vertical range of the output of the vertical normalization unit 26. The vertical normalization process is performed on the character pattern one column at a time as the same is shifted through the vertical normalization unit 26. The operations in response to the outputs V2 and V4 are similar to those described above with respect to the outputs V1 and V5, and are shown in FIGS. 12b and 12d.

Figure 13:
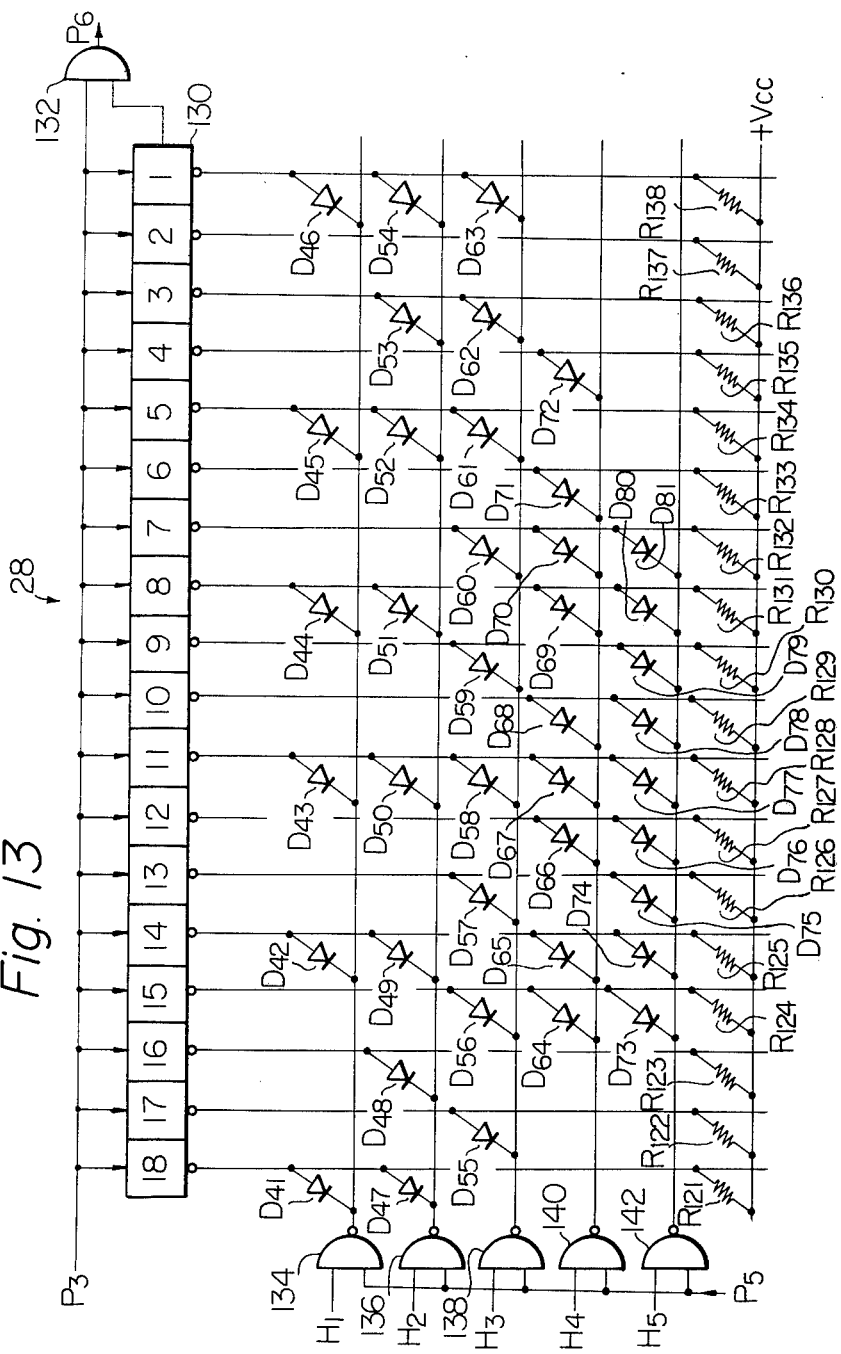
FIG. 13 is a schematic diagram of a horizontal normalizaition unit shown in FIG. 1.

The horizontal normalization unit 128 is shown in FIG. 13, and comprises an 18 bit or stage shift register 130 and an AND gate 132. The shift pulses P6 for the main memory 16 are produced at the output of the AND gate 132, and inputs of the AND gate 132 are connected to receive the auxiliary memory shift pulses P3 and to the output of the rightmost stage of the shift register 130. The shift pulses P3 are also applied to the shift inputs of the stages of the shift register 130. Inversion inputs to stage 1 to 18 of the shift register 130 are connected to the +Vcc source through resistors R138 to R121 respectively. First inputs of NAND gates 134, 136, 138, 140 and 142 are connected to the outputs H1, H2, H3, H4 and H5 of the sensing unit 20 respectively. Second inputs of the NAND gates 134, 136, 138, 140 and 142 are connected to receive the signal P5. The output of the NAND gate 134 is connected through diodes D41 to D46 to the inversion inputs of the stages 18, 14, 11, 8, 5 and 1 of the shift register 130 respectively. The output of the NAND gate 136 is connected through diodes D47 to D54 to the inversion inputs of stages 18, 16, 14, 11, 8, 5, 3 and 1 respectively. The output of the NAND gate 138 is connected through diodes D55 to D63 to the inversion inputs of stages 17, 15, 13, 11, 9, 7, 5, 3 and 1 respectively. The output of the NAND gate 140 is connected through diodes D64 to D72 to the inversion inputs of stages 15, 14, 12, 11, 10, 8, 7, 6 and 4 respectively. The output of the NAND gate 142 is connected through diodes D73 and D81 to the inversion inputs of stages 15 to 7 respectively. In all cases, the cathodes of the diodes D41 to D81 are connected to the outputs of the respective NAND gates 134, 136, 138, 140 and 142.

In operation, the shift pulses P3 are applied to the auxiliary memory 18, to the AND gate 132 and to the shift register 130. The basic principle of the horizontal normalization unit 28 is that if the frequency of the pulses P6 is equal to half (the ratio of the number of rows of the main and auxiliary memories 16 and 18) the frequency of the shift pulses P3, the character pattern will be uniformly compressed in the horizontal direction by a factor of 2 while being shifted from the auxiliary memory 18 into the main memory 16. If the ratio of the frequencies of the pulses P6/P3 is greater and smaller than one-half, the character pattern will be expanded and contracted respectively in the horizontal direction while being shifted.

In response to the output H3 of the sensing unit 20 and in coincidence with the signal P5, the NAND gate 138 will produce a logical "0" output. The diodes D55 to D63 will be forward biased so that a logical "0" is applied to the inversion inputs of stages 17, 15, 13, 11, 9, 7, 5, 3 and 1 of the shift register 130 so that the same will be set to logical "1". The outputs of the NAND gates 134, 136, 140 and 142 will be logical "1" and all of the diodes except the diodes D55 to D63 will be reverse biased and a logical "1" will be applied to the respective inversion inputs of the shift register 130 to set the respective stages to logical "0". In response to the shift pulses P3, the contents of the shift register 130 will be shifted out rightward through the AND gate 132 as the pulses P6 to shift the main memory 16.

Figure 14A:
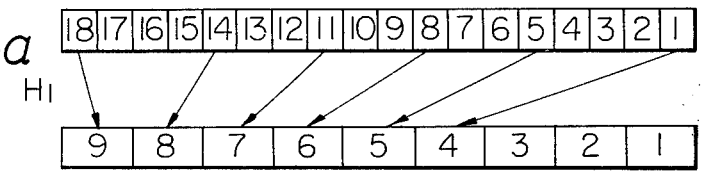
FIG. 14a to 14e are graphic illustrations of the operation of the horizontal normalization unit shown in FIG. 13.
Figure 14B:
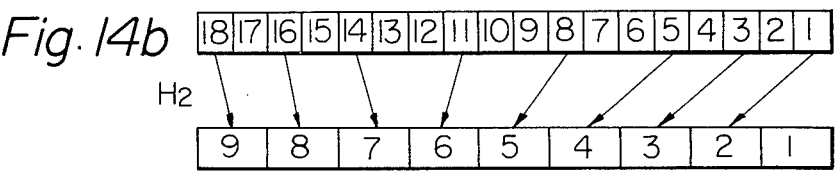
Figure 14C:
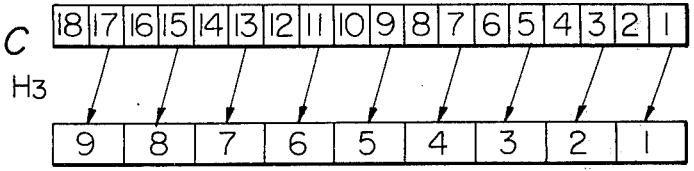
Figure 14D:
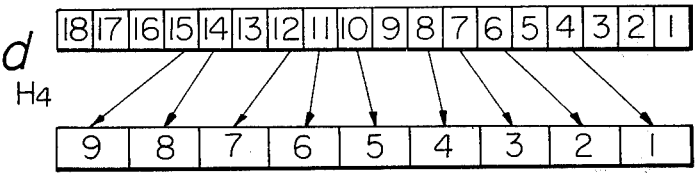
Figure 14E:
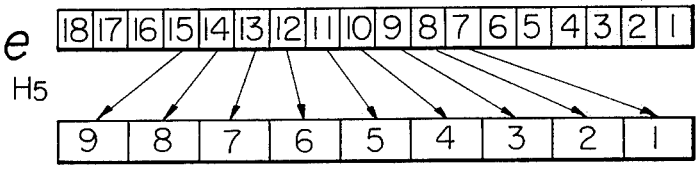
Figure 15:
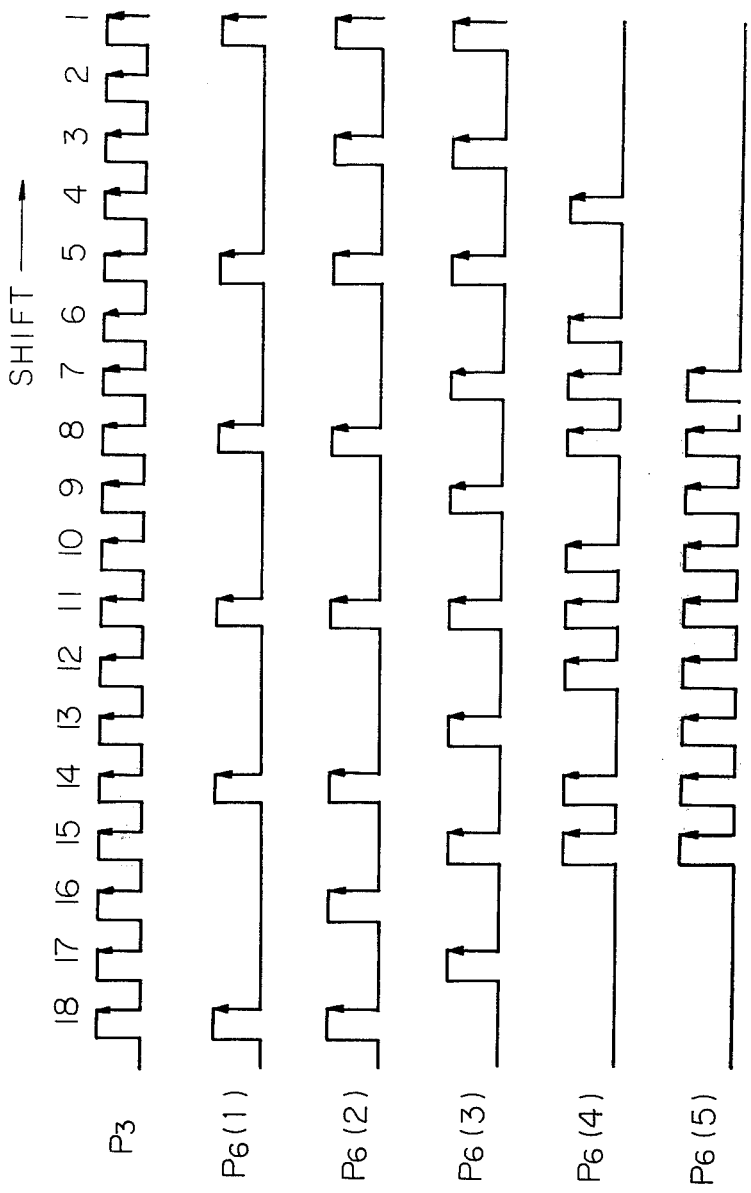
FIG. 15 is a graphic illustration of shift pulse utilized with the horizontal normalization unit shown in FIG. 13.

Referring now to FIG. 15, it will be seen that the frequency of the shift pulses P6(3) produced in response to the output H3 is one-half that of the shift pulses P3, so the character pattern is uniformly compressed by a factor of two while being shifted into the main memory 16. This is clearly shown in FIG. 14, in which the upper of each set of two rows represents the 2n or 18 horizontal bits of each row of the auxiliary memory 18 and the lower of each set represents the n or 9 horizontal stages or bits of the main memory 16. FIG. 14c clearly shows how the character pattern is uniformly compressed into the main memory 16.

In response to the output H1 representing maximum excessive horizontal second-order moment, the NAND gate 134 produces a logical "0" output so that the stages 18, 14, 11, 8, 5 and 1 of the shift register 130 are set to logical "1". In this case, the pulses P6(1) shown in FIG. 15 are generated by the horizontal normalization unit 28 and applied to the main memory 16. since the ratio of the frequencies of the pulses P6/P3 is less than one-half, the character pattern is compressed to a maximum extent as shown in FIG. 14a, so that the entire horizontal extent of the character pattern is compressed into stages 4 to 9 of the main memory 16.

In response to the output H5 representing maximum insufficient horizontal second-order moment, the NAND gate 142 produces a logical "0" output so that the pulses P6(5) of FIG. 15 are produced. Since the ratio P6/P3 is greater than one-half, the character pattern is expanded as shown in FIG. 14e. In this case, the bits 7 to 15 of the auxiliary memory 18 are expanded to occupy the stages 1 to 9 of the main memory 16. In order to produce the desired effect shown in FIG. 14, the pulses P6 may be applied also to read-in inputs of the leftmost stages of the shift registers of the main memory 16, although not shown. Also, the pulses P6 may be delayed before being applied to the read-in inputs and the puses P3 may be delayed by an even longer time period than the pulses P6 before being applied to the auxiliary memory 18.

Figure 16:
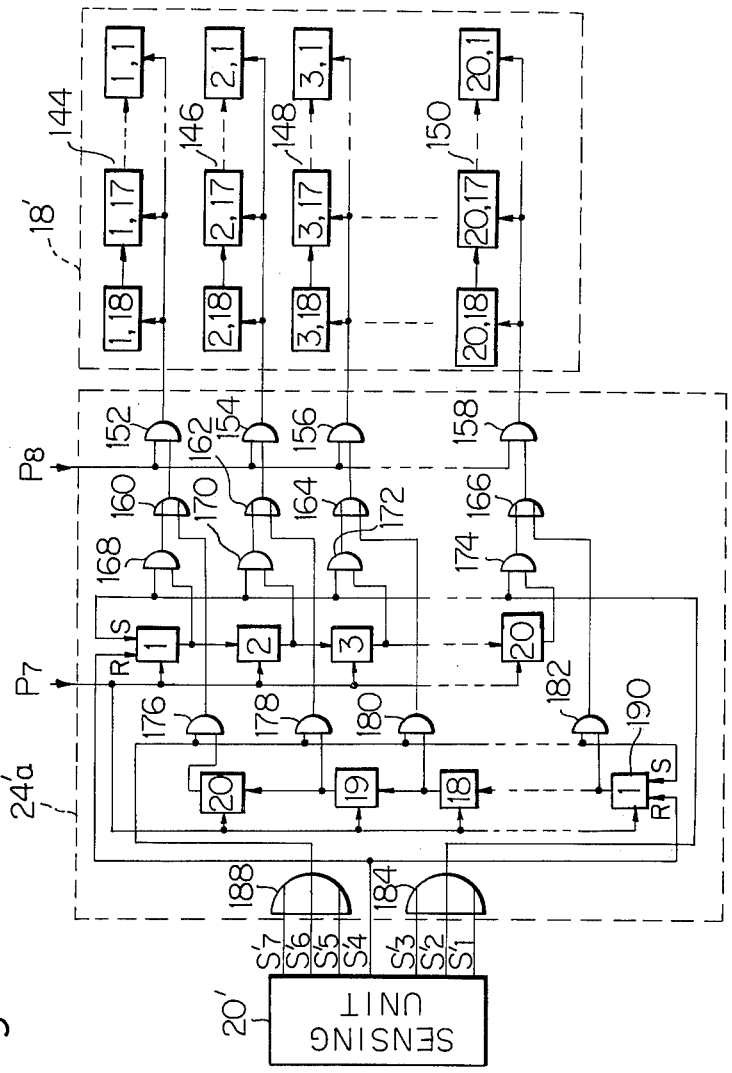
FIG. 16 is a schematic diagram of part of an alternative slant normalization unit embodying the present invention.
Figure 17A:
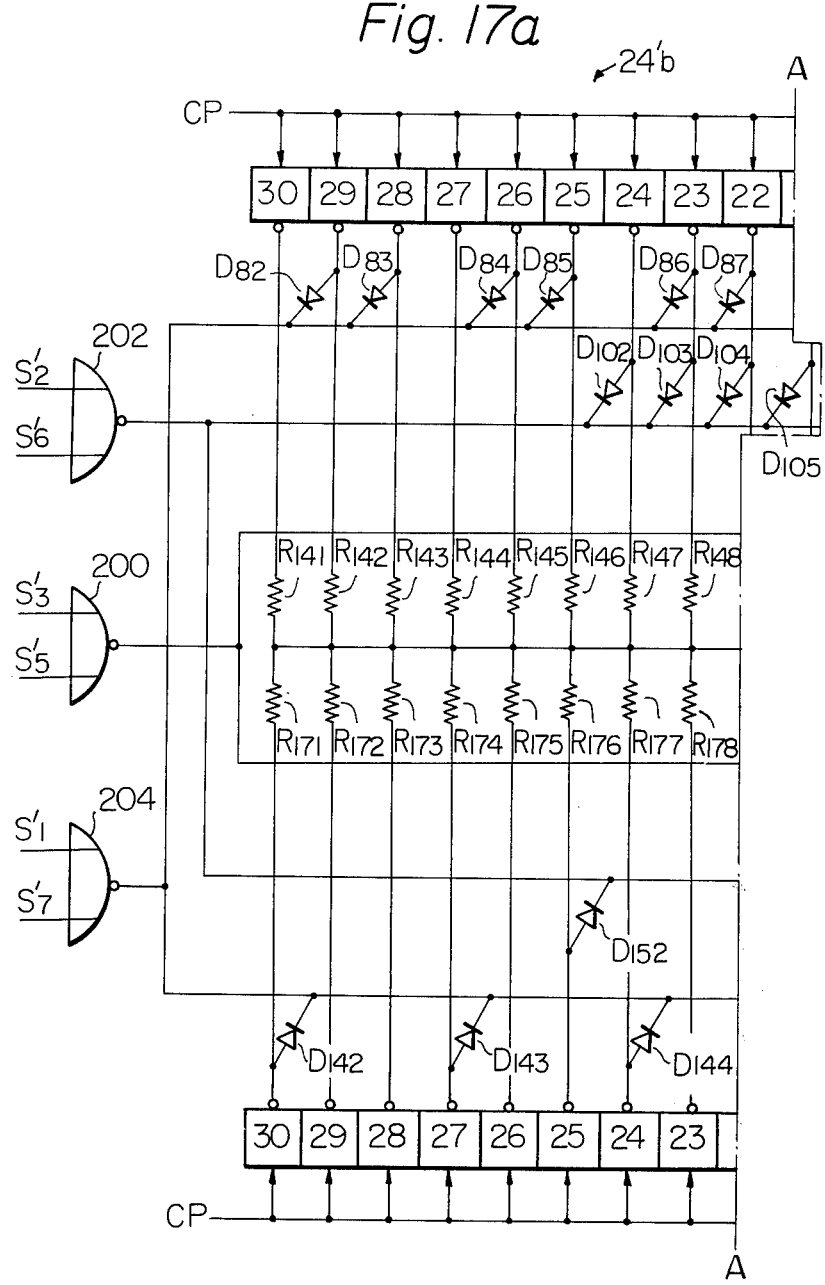
Figure 17B:
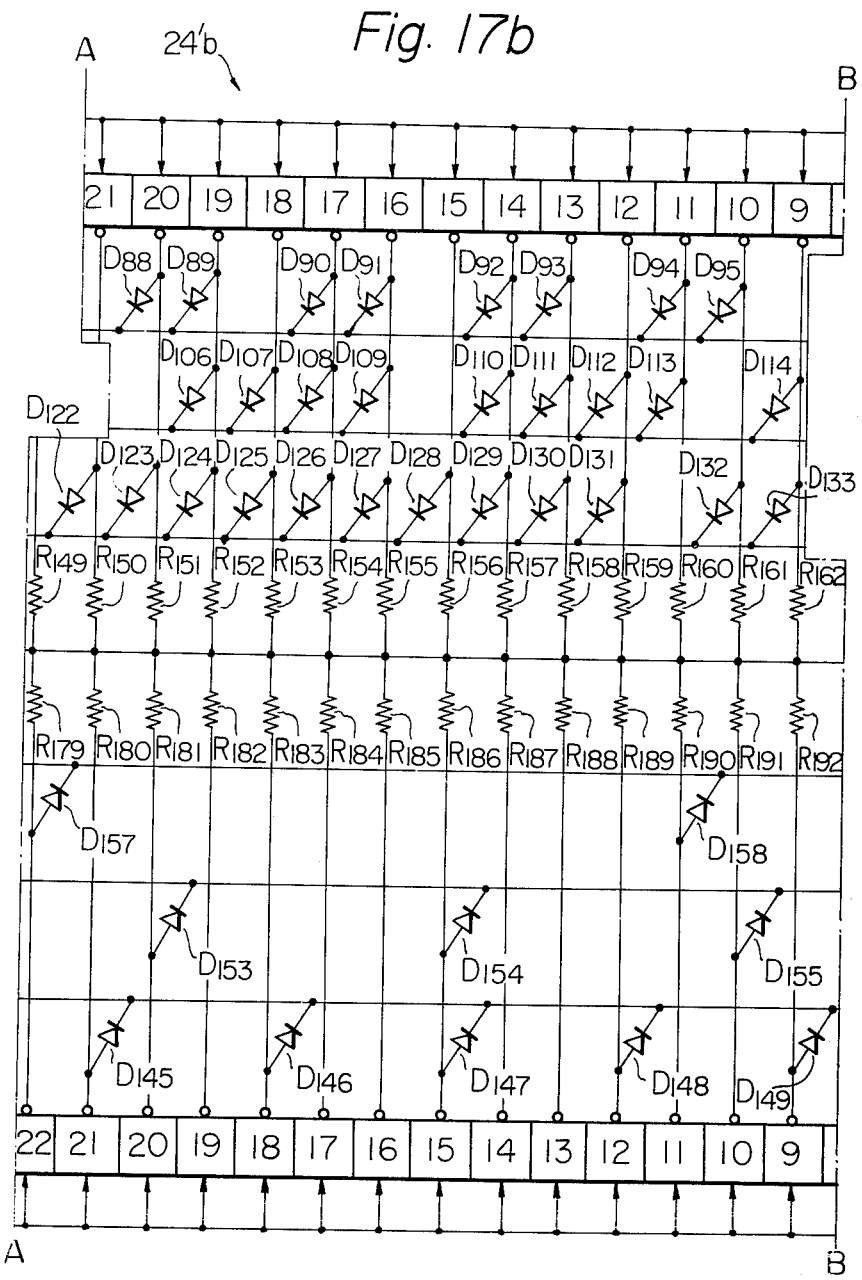

The alternative slant normalization unit 24' is shown in FIGS. 16 and 17 comprising subunits 24'a and 24'b respectively. In FIG. 16, the subunit 24'a is shown connected to a modified sensing unit 20' and a modified auxiliary memory 18'. The sensing unit 20' is adapted to produce 7 slant outputs S'1 to S'7. The output S'4 represents zero slant. The output S'3 represents leftward slant, the output S'2 more leftward slant and the output S'1 even more leftward slant. The output S'5 represents rightward slant, the output S'6 more rightward slant and the output S'7 even more rightward slant. The auxiliary memory 18' differs from the auxiliary memory 18 in that the rows are shiftable independently rather than together in parallel. The auxiliary memory 18' comprises 20 shift registers, each having a bit capacity of 18. Only 4 of the shift registers are shown and designated as 144, 146, 148 and 150, representing the 1st, 2nd, 3rd and 20th rows respectively. The shift inputs of the shift registers 144, 146, 148 and 150 are connected to the outputs of AND gates 152, 154, 156 and 158 respectively. First inputs to the AND gates 152, 154, 156 and 158 are connected to receive shift pulses P8, and second inputs are connected to the outputs of OR gates 160, 162, 164 and 166 respectively. First inputs of the OR gates 160, 162, 164 and 166 are connected to the outputs of AND gates 168, 170, 172 and 174 respectively, and second inputs are connected to the outputs of AND gates 176, 178, 180 and 182 respectively.

First inputs of the AND gates 168, 170, 172 and 174 are connected to the output of an OR gate 184, and second inputs are connected to the outputs of stages 1, 2, 3 and 20 of a 20 bit shift register 186 respectively. The output of the OR gate 184 is also applied to the set input S of the first stage of the shift register 186, and the output S'4 of the sensing unit 20' is appled to the reset input R thereof. The shift inputs of the stages of the shift register 186 are adapted to receive shift pulses P7. First inputs of the AND gates 176, 178, 180 and 182 are connected to the output of an OR gate 188, and second inputs are connected to the outputs of stages 20, 19, 18 and 1 of a 20 bit shift register 190 respectively. The output of the OR gate 188 is also applied to the set input S of the first stage of the shift register 190, and the output S'4 of the sensing unit 20' is applied to the reset input R thereof. The shift pulses P7 are also applied to the shift inputs of the stages of the shift register 190. The outputs S'5, S'6 and S'7 are applied to the inputs of the OR gate 188, and the outputs S'1, S'2 and S'3 are applied to inputs of the OR gate 184.

FIG. 17 shows the subunit 24'b, which is adapted to produce the shift pulses P7 and P8. The subunit 24'b comprises a 30 bit shift register 192 and an AND gate 194. The shift register 192 is arranged to shift from left to right, and the output of the rightmost stage 1 is applied to an input of the AND gate 194. A train of 30 clock pulses is applied to the shift inputs of the shift register 192 and also to another input of the AND gate 194. The shift pulses P7 appear at the output of the AND gate 194. A 30 bit shift register 196 and an AND gate 198 are arranged in an identical manner as the shift register 192 and the AND gate 194 except that the shift pulses P8 appear at the output of the AND gate 198. Inversion inputs of the stages 30 to 1 of the shift register 192 are connected to the +Vcc supply voltage through resistors R141 to R170 respectively, and inversion inputs of the stages 30 to 1 of the shift register 196 are connected to the +Vcc supply voltage through resistors R171 to R200 respectively.

Three NAND gates are provided and designated as 200, 202 and 204 respectively. Inputs of the NAND gate 200 are connected to the outputs S'3 and S'5 of the sensing unit 20'. The output of the NAND gate 200 is connected through diodes D122 to D131 to the inversion inputs of stages 21 to 12 of the shift register 192 respectively, and through diodes D132 to D141 to the inversion inputs of stages 10 to 1 thereof. The output of the NAND gate 200 is also connected through diodes D157 and D158 to the inversion inputs of stages 22 and 11 respectively of the shift register 196.

Inputs of the NAND gate 202 are connected to the outputs S'2 and S'6 of the sensing unit 20', and the output thereof is connected through diodes D102 to D105, D106 to D109, D110 to D113, D114 to D117 and D118 to D121 to the inversion inputs of the stages 24 to 21, 19 to 16, 14 to 11, 9 to 6 and 4 to 1 respectively of the shift register 192. The output of the NAND gate 202 is also applied through diodes D152 to D156 to the inversion inputs of the stages 25, 20, 15, 10 and 5 respectively of the shift register 196.

Inputs of the NAND gate 204 are connected to the outputs S'1 and S'7 of the sensing unit 20'. The output of the NAND gate 204 is applied through diodes D82 to D101 to the inversion inputs of stages 29, 28, 26, 25, 23, 22, 20, 19, 17, 16, 14, 13, 11, 10, 8, 7, 5, 4, 2 and 1 respectively of the shift register 192, and also through diodes D142 to D151 to the stages 30, 27, 24, 21, 18, 15, 12, 9, 6 and 3 of the shift register 196 respectively.

The NAND gates, diodes and resistors of the subunit 24'b constitute an encoder, and the operation is essentially similar to that of the horizontal normalization unit 28 in that a logical "1" input to one of the NAND gates 200, 202 and 204 will set the stages of the shift registers 192 and 196 to which the respective NAND gate is connected through diodes to logical "1".

Figure 18A:
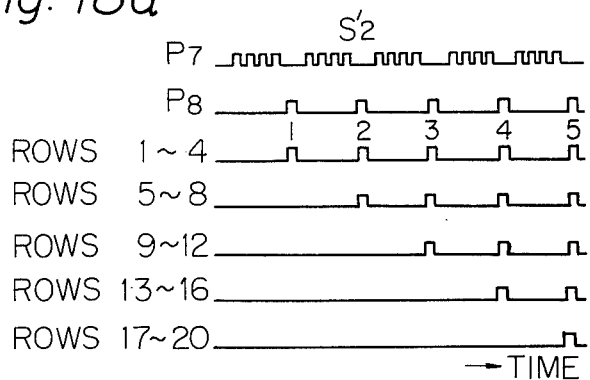
FIGS. 18a and 18d are graphic illustrations of shift pulses utilized with the slant normalization unit shown in FIGS. 16 and 17.
Figure 18B:
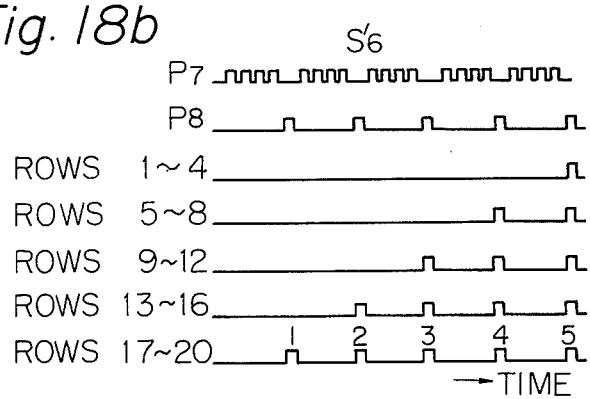
Figure 18C:
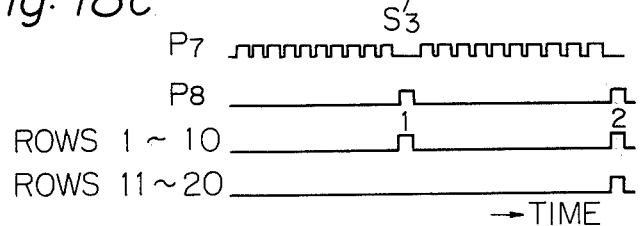

In response to one of the outputs S'3 and S'5 of the sensing unit 20' representing moderate slant, the NAND gate 200 will produce a logical "0" output and in response to the 30 clock pulses CP, the subunit 24'b will produce the pulses P7 and P8 as shown in FIG. 18c, in the form of two alternating sets of 10 P7 pulses and 1 P8 pulse. In response to one of the outputs S'2 and S'6 representing more slant, the NAND gate 202 will produce a logical "0" output and the pulses P7 and P8 shown in FIG. 18a will be produced, consisting of five sets of four P7 pulses and one P8 pulse. In response to one of the outputs S'1 and S'7 representing maximum slant, the NAND gate 204 will produce a logical "0" output and the pulses P7 and P8 shown in FIG. 18d will produced consisting of ten sets of two P7 pulses and one P8 pulse.

The operation of the slant normalization unit 24' will now be described with reference to FIGS. 16 and 18. The shift registers 186 and 190 are preliminarily cleared by means not shown. With the output S'4 representing zero slant applied to the reset inputs of the shift register s 186 and 190, in response to the pulses P7, the stages of the shift registers 186 and 190 will shift, but the stage outputs applied to the inputs of the AND gates 168, 170, 172, 174, 176, 178, 180 and 182 will be logical "0" at all times. Both inputs to the OR gates 160, 162, 164 and 166 will also be logical "0" as well as the outputs thereof applied to the inputs of the AND gates 152, 154, 156 and 158 respectively. The outputs of the AND gates 152, 154, 156 and 158 will also remain logical "0", so that no shifting of the shift registers 144, 146, 148 and 150 respectively will occur.

In response to the output S'3 representing moderate leftward slant, the logical "1" output of the OR gate 184 is applied to the inputs of the AND gates 168, 170, 172 and 174 to enable the same so that the contents of the stages of the shift register 186 appear at the inputs of the OR gates 160, 162, 164 and 166, and are applied therethrough to the inputs of the AND gates 152, 154, 156 and 158 respectively. In response to one of the shift pulses P8, only the AND gates 152, 154, 156 and 158 corresponding to a stage of the shift register 186 which is logical "1" will produce a logical "1" pulse output to shift the respective shift register 144, 146, 148 and 150 of the auxiliary memory 18' rightward by one step.

The output of the OR gate 184 is also applied to the set input S of the shift register 186, so that in response to the shift pulses P7, the stages of the shift register 186 will sequentially become logical "1" from stage 1 toward stage 20. It will be noticed that since the output of the OR gate 188 is logical "0", the outputs of the AND gates 176, 178, 180 and 182 applied to the inputs of the OR gates 160, 162, 164 and 166 respectively are logical "0".

The combined operation is shown in FIG. 18c. In response to the first 10 shift pulses P7, the first 10 stages of the shift register 186 will become logical "1". In response to the first shift pulse P8, the contents of the shift register 186 will be gated to the auxiliary memory 18' so that the upper 10 rows of the auxiliary memory 18' will be shifted rightward by one step. In response to the second set of 10 shift pulses P7, all of the stages of the shift register 186 will become logical "1", and in response to the second shift pulse P8, all of the rows of the auxiliary memory 18' will be shifted rightward by one step. Thus, the upper 10 rows are shifted rightward a total of 2 times and the lower 10 rows are shifted a total of 1 time to skew the character pattern rightward to correct for moderate leftward slant.

Figure 18D:
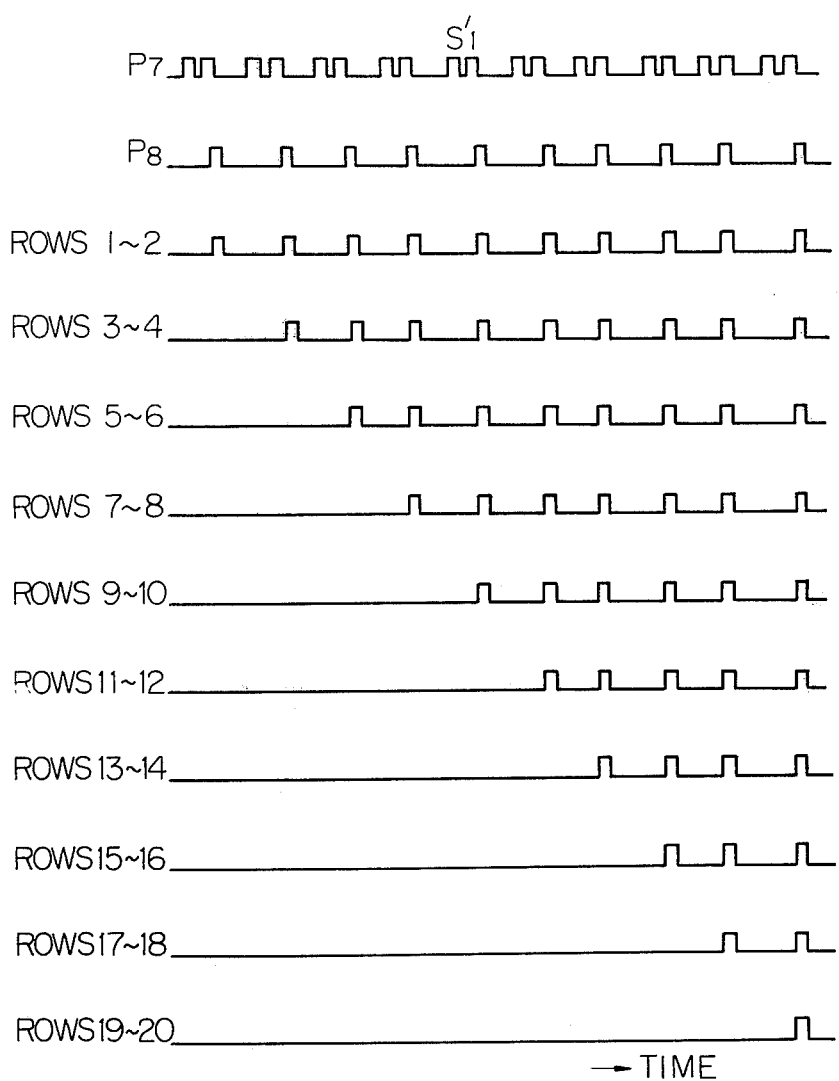

The operation is similar in response to the output S'2, representing more leftward slant, as shown in FIG. 18a. The status of all of the AND and OR gates is the same as in response to the output S'3. In this case, however, the auxiliary memory 18' is shifted rightward 4 rows at a time rather than 8 rows at a time, so that rows 1 to 4, 5 to 8, 9 to 12, 13 to 16 and 17 to 20 are shifted rightward by 5, 4, 3, 2 and 1 steps respectively to skew the character pattern farther rightward. As shown in FIG. 18d, which illustrates maximum correction for leftward slant in response to the output S'1, the rows 1 and 2, 3 and 4, 5 and 6, 7 and 8, 9 and 10, 11 and 12, 13 and 14, 15 and 16, 17 and 18, 19 and 20 are shifted rightward by 10, 9, 8, 7, 6, 5, 4, 3, 2 and 1 step respectively to provide maximum correction for leftward slant.

As illustrated in FIG. 18b, the shift pattern produced in response to the output S'6 is vertically symmetrical to the shift pattern produced in response to the output S'2, since the shift pulses p7 and P8 are the same. In this case, it is necessary to correct for medium rightward slant, and therefore to shift the bottom of the character pattern more than the top. In this case, the OR gate 188 produces a logical "1" output, so that the AND gates 176, 178, 180 and 182 are enabled to gate the contents of the shift register 190 rather than the shift register 186 to the auxiliary memory 18'. Since the shift register 190 is adapted to shift upward as shown rather than downward as is the shift register 186, the stages of the shift register 190 will progressively become logical "1" in response to the shift pulses P7 moving from bottom to top, and the bottom of the character pattern in the auxiliary memory 18' will be shifted more than the top to skew the character pattern leftward to correct for rightward slant. The shift patterns of the auxiliary memory 18' in response to the outputs S'5 and S'7 are vertically symmetrical to those for the outputs S'3 and S'1 respectively, and are not shown. Rightward displacement of the centroid of the character pattern resulting from slant normalization can be corrected in the evaluation unit 22, and contrast normalization means may also be provided in the evaluation unit 22 is desired. In an alternative arrangement, the centroid of the character pattern amy be normalized by recirculation through the main memory 16 after slant, vertical and horizontal moment normalization.

What is claimed is;

1. A method of normalizing a character pattern in the form of electrical signals constituting a quantized representation of a character, comprising the steps of:
   a. storing the character pattern in both a main memory and an auxiliary memory;
   b. sensing the value of at least one spatial parameter of the character pattern in the main memory; and
   c. normalizing the at least one spatial parameter while transferring the character pattern from the auxiliary memory to the main memory in accordance with the sensed value;
   the at least one spatial parameter including the slant of the character pattern, said main and auxiliary memories comprising rectangular arrays of memory elements corresponding to respective points of the character pattern;
   step (c) comprising, for each respective column of memory elements of the main and auxiliary memories:
   gating electrical signals from memory elements of the auxiliary memory to memory elements of the main memory, said memory elements of the main memory to which the electrical signals are gated being said respective column of memory elements, said memory elements of said auxiliary memory from which the electrical signals are gated being spaced to the left of said respective column of memory elements to normalize leftward slant and being spaced to the right of said respective column of memory elements to normalize rightward slant, a spacing of said memory elements of said auxiliary memory from which the electrical signals are gated progressively increasing from a bottom of said auxiliary memory relative to a top of said auxiliary memory.

2. A method of normalizing a character pattern in the form of electrical signals constituting a quantized representation of a character, comprising the steps of:
   a. storing the character pattern in both a main memory and an auxiliary memory;
   b. sensing the value of at least one spatial parameter of the character pattern in the main memory; and
   c. normalizing the at least one spatial parameter while transferring the character pattern from the auxiliary memory to the main memory in accordance with the sensed value;
   said main and auxiliary memories comprising rectangular arrays of memory elements corresponding to respective points of the character pattern and being divided into upper portions and lower portions;
   step (c) comprising:
   gating an electrical signal from a first memory element of the upper portion of the auxiliary memory to a second memory element of the upper portion of the main memory, the first memory element being spaced in a first direction from a third memory element of the auxiliary memory corresponding to the second memory element of the main memory; and
   gating an electrical signal from a fourth memory element of the lower portion of the auxiliary memory to a fifth memory element of the lower portion of the main memory, the fourth memroy element being spaced in a second direction from a sixth memory element of auxiliary memory corresponding to the fifth memory element of the main memory and the second direction being opposite to the first direction.

3. The method according to claim 2, in which the at least one spatial parameter of the character pattern includes the vertical size of the character pattern, the first direction being from the lower portions toward the upper portions of the main and auxiliary memories to increase the vertical size and from the upper portions toward the lower portions of the main and auxiliary memories to decrease the vertical size; the second direction being from the lower portions toward the upper portions to decrease the vertical size and from the upper portions toward the lower portions to increase the vertical size.

4. The method according to claim 2, in which the at least one spatial parameter includes the slant of the character pattern, the first direction being from left to right in the main and auxiliary memories to normalize leftward slant and from right to left in the main and auxiliary memories to normalize rightward slant and the second direction being from left to right to normalize rightward slant and from right to left to normalize rightward slant.

5. The method according to claim 2, in which the main memory has a capacity smaller than a capacity of the auxiliary memory, the character pattern being stored in the main memory in a compressed form relative to a form in which the character pattern is stored in the auxiliary memory in step (a), the character pattern being compressed in step (c).

6. The method according to claim 2, further comprising the step of:
   d. uniformly thickening the line thickness of the character pattern before step (a).

7. The method according to claim 2, in which the at least one spatial parameter includes the horizontal size of the character pattern, and in which step (c) includes applying first and second shift pulse trains to rows of the auxiliary memory and the main memory respectively over a predetermined time period in such a manner that a frequency of the second pulse train is greater than a frequency of the first pulse train to increase the horizontal size of the character pattern, and a frequency of the second pulse train is smaller than a frequency of the first pulse train to decrease the horizontal size of the character pattern.

8. In a system having a two-dimensional memory consisting of shift registers to store a quantized character pattern in the form of electrical signals, each shift register being shiftable independently in one dimension, apparatus to change the slant of the character pattern within the memory, said apparatus comprising:

a slant shift register having a number of stages equal to the number of shift registers of the memory;

a plurality of AND gates in a number equal to the number of shift registers of the memory, the outputs of said AND gates being connected to the shift inputs of the shift registers of the main memory respectively, the outputs of the stages of said slant shift register being sequentially connected to first inputs of said AND gates respectively; and a shift pulse generator having a first shift pulse output connected to the shift input of said slant shift register and a second shift pulse output connected to second inputs of all of said AND gates;

said shift pulse generator being arranged so that with the set input of the first stage of said slant shift register maintained logically positive, in response to first shift pulses from the first shift pulse output of said shift pulse generator, the stages of said slant shift register will progressively become logically positive, and in response to second shift pulses from the second shift pulse output of said shift pulse generator, shift registers of the memory having shift inputs connected through said AND gates to the outputs of stages of said slant shift register which are logically positive will shift so that the slant of the character pattern is changed, the degree of change being dependent on the ratio of the frequency of said first shift pulses to the frequency of said second shift pulses.

9. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto;

normalization means operatively connected to said main memory and said auxiliary memory and responsive to said at least one normalization signal, said normalization means being operative to shift the character pattern from said auxiliary memory to said main memory and normalize said at least one spatial parameter in accordance with said at least one normalization signal as the character pattern is being shifted; and thickening means connected between the scanning means and said main and auxiliary memories to thicken the line thickness of the character pattern, said thickening means comprising:

a first shift register having a capacity equal to a number of rows of said auxiliary memory;

a second shift register having a capacity equal to the number of rows of said auxiliary memory and having its input connected to the output of said first shift register, the scanning means being operative to store the electrical signals resulting from two successive main scans of the document in said second and first shift registers respectively; and a plurality of OR gates having inputs connected to said first and second shift registers so that each OR gate has one input connected to a first selected point in said second shift register and another input connected to a second selected point in said first shift register corresponding to a point in the character pattern diagonally adjacent to said first selected point, the outputs of said OR gates being connected to the inputs of corresponding rows of said main and auxiliary memories.

10. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto; and normalization means operatively connected to said main memory and said auxiliary memory and responsive to said at least one normalization signal, said normalization means being operative to shift the character pattern from said auxiliary memory to said main memory and normalize said at least one spatial parameter in accordance with said at least one normalization signal as the character pattern is being shifted;

and at least one spatial parameter including the slant of the character pattern;

said sensing means comprising:

a resistor weighting network;

an operational amplifier having an input connected to a plurality of points in said main memory through said resistor weighting network, said operational amplifier being arranged to produce at its output an electrical slant signal corresponding to a weighted function of the value of the slant of the character pattern; and a quantizer having its input connected to the output of said operational amplifier and a plurality of outputs corresponding to the sub-ranges of the range of said electrical slant signal, the output of said quantizer energized in accordance with the sensed slant of the character pattern constituting one of said at least one normalization signals.

11. A system according to claim 10, in which said quantizer has three outputs corresponding respectively to zero slant, leftward slant and rightward slant, and in which said normalization means includes a slant normalization unit which comprises:

a plurality of OR gates in a number equal to a number of rows of said auxiliary memory, the outputs of said OR gates constituting the output of said slant normalization unit, each OR gate being associated with a respective row of said auxiliary memory;

a plurality of AND gates in a number equal to 3 times the number of said OR gates and being arranged in groups of 3, the outputs of each group of 3 AND gates being connected to the inputs of a respective OR gate;

first inputs of each group of 3 AND gates being connected to points in the respective row of said auxiliary memory so that for the upper portion of said auxiliary memory, the first input of a first AND gate of each group is connected to a selected point in the respective row, the first input of a second AND gate of each group is connected to a point to the left of the selected point in the respective row and the first input of a third AND gate of each group is connected to a point to the right of the selected point in the respective row;

second inputs of each group of 3 AND gates being connected to said quantizer so that the second input of the first AND gate of each group is connected to the zero slant output of said quantizer, the second input of the second AND gate of each group is connected to the leftward slant output of the quantizer and the second input of the third AND gate of each group is connected to the rightward slant output of said quantizer; and for the lower portion of said auxiliary memory:

the first input of the first AND gate of each group is connected to a selected point in the respective row, the first input of the second AND gate of each group is connected to a point to the right of the selected point in the respective row and the first input of the third AND gate of each group is connected to a point to the left of the selected point in the respective row;

second inputs of each group of 3 AND gates being connected to said quantizer so that the second input of the first AND gate of each group is connected to the zero slant output of said quantizer, the second input of the second AND gate of each group is connected to the leftward slant output of said quantizer and the second input of the third AND gate of each group is connected to the rightward slant output of said quantizer.

12. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto; and normalization means operatively connected to said main memory and responsive to said at least one normalization signal, said normalization means being operative to shift the character pattern from said auxiliary memory to said main memory and normalize said at least one spatial parameter in accordance with said at least one normalization signal as the character pattern is being shifted;

said at least one spatial parameter including at least one of the vertical and horizontal second-order moments of the character pattern about horizontal and vertical axes respectively intersecting at the centroid of the character pattern, said sensing means having three outputs corresponding to a normal vertical second-order moment of the character pattern, an excessive vertical second-order moment of the character pattern and an insufficient vertical second-order moment of the character pattern respectively, one of said outputs being energized in accordance with the sensed vertical second-order moment of the character pattern to constitute one of said at least one normalization signals;

said normalization means including a vertical normalization unit which comprises:

a plurality of OR gates in a number equal to a number of rows of said main memory, the outputs of said OR gates constituting the output of said vertical normalization unit and being connected respectively to the inputs of the rows of said main memory, said OR gates being connected to a selected column of said auxiliary memory;

a plurality of AND gates in a number equal to 3 times the number of said OR gates and being arranged in groups of 3, the outputs of each group of 3 AND gates being connected to the inputs of a respective OR gate;

first inputs of each group of 3 AND gates being connected to rows in the selected column of said auxiliary memory so that for the upper portion of said auxiliary memory the first input of a first AND gate of each group is connected to a selected row of said auxiliary memory corresponding to the equivalent row in said main memory to which the OR gate associated with the group is connected, the first input of a second AND gate of each group is connected to a row above the respective selected row and the first input of a third AND gate of each group is connected to a row below the respective selected row;

second inputs of each group of 3 AND gates being connected to the outputs of said sensing means so that the second input of the first AND gate of each group is connected to the normal vertical moment output, the second input of each second AND gate of each group is connected to the excessive vertical moment output and the second input of the third AND gate of each group is connected to the insufficient vertical moment output; and for the lower portion of said auxiliary memory;

the first input of the first AND gate of each group is connected to a selected row of said auxiliary memory corresponding to the equivalent row in said main memory to which the OR gate associated with the group is connected, the first input of the second AND gate of each group is connected to a row below the respective selected row and the first input of the third AND gate of each group is connected to a row above the respective selected row; and second inputs of each group of 3 AND gates being connected to the outputs of said sensing means so that the second input of the first AND gate of each group is connected to the normal vertical moment output, the second input of each second AND gate of each group is connected to the excessive vertical moment output and the second input of the third AND gate of each group is connected to the insufficient vertical moment output.

13. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto; and normalization means operatively connected to said main memory and said auxiliary memory and responsive to said at least one normalization signal, said normalization means being operative to shift the character pattern from said auxiliary memory to said main memory and normalize said at least one spatial parameter in accordance with said at least one normalization signal as the character pattern is being shifted;

said main memory having a capacity smaller than a capacity of said auxiliary memory and the character pattern being stored in said main memory in a compressed form relative to a form in which the character pattern is stored in said auxiliary memory, said normalization means being further operative to compress the character pattern as the character pattern is being shifted from said auxiliary memory to said main memory;

said at least one spatial parameter including the horizontal second-order moment of the character pattern about a vertical axis passing through the centroid of the character pattern, and in which said sensing means has three outputs corresponding to a normal horizontal second-order moment of the character pattern, an excessive horizontal second-order moment and an insufficient horizontal moment respectively, one of said outputs being energized in accordance with the sensed horizontal second-order moment of the character pattern to constitute one of said at least one normalization signals, said normalization means including a horizontal normalization unit which comprises:

a shift register having a shift input responsive to shift pulses generated by said normalization means for said auxiliary memory;

an AND gate having an output connected to the shift input of said main memory, one input responsive to said auxiliary memory shift pulses and another input connected to the serial output of said shift register; and an encoder having inputs connected to the outputs of said sensing means and outputs connected to set inputs of the stages of said shift register, said encoder being arranged to set predetermined stages of said shift register in accordance with the energized output of said sensing means so that in response to the auxiliary memory shift pulses, the output pulse frequency of said shift register and thereby said horizontal normalizating unit will be equal to, less or greater respectively than the frequency of the auxiliary memory shift pulses multiplied by the ratio of the number of rows of said main memory to the number of rows of said auxiliary memory when the normal, excessive and insufficient horizontal moment output respectively of said sensing means is energized in response to the sensed horizontal second-order moment of the character pattern.

14. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto; and normalization means operatively connected to said main memory and said auxiliary memory and responsive to said at least one normalization means being operative to shift the character pattern from said auxiliary memory to said main memory and normalize said at least one spatial parameter in accordance with said at least one normalization signal as the character pattern is being shifted;

said at least one spatial parameter including at least one of the vertical and horizontal second-order moments of the character pattern about horizontal and vertical axes respectively intersecting at the centroid of the character pattern;

said normalization means comprising a vertical normalization unit which comprises gate means operative to normalize the vertical second-order moment of the character pattern by gating an electrical signal from a memory element of said auxiliary memory representing a point above a first selected point in an upper portion of the character pattern to a memory element of said main memory representing the first selected point and gating an electrical signal from a memory element of said auxiliary memory representing a point in the character pattern below a second selected point in a lower portion of the character pattern to a memory element of said main memory representing the second selected point to decrease the vertical second-order moment; and said gate means being operative to gate an electrical signal from a memory element of said auxiliary memory representing a point below the first selected point in the upper portion of the character pattern to the memory element of the main memory representing the first selected point and gate an electrical signal from a memory element of said auxiliary memory representing a point in the character pattern above the second selected point in the lower portion of the character pattern to the memory element of the main memory representing the second selected point to increase the vertical second-order moment.

15. The system according to claim 14, in which said normalization means is operative to normalize the slant of the character pattern by applying shift pulses to rows of said memory in such a manner that a number of shift pulses progressively increases from a top to a bottom of the auxiliary memory to normalize rightward slant and progressively increases from the bottom to the top of the auxiliary memory to normalize leftward slant.

16. The system according to claim 14, in which said normalization means comprises a horizontal normalization unit operative to normalize the horizontal second-order moment of the character pattern by generating and applying first and second pulse trains to rows of said auxiliary memory and said main memory respectively over a predetermined time period, a frequency of the second pulse train being greater than a frequency of the first pulse train to increase the horizontal second-order moment of the character pattern, a frequency of the second pulse train being smaller than a frequency of the first pulse train to decrease the horizontal second-order moment of the character pattern.

17. In an optical character recognition system in which a document is scanned by scanning means to produce a character pattern in the form of electrical signals constituting a quantized representation of a character printed on the document, a character pattern normalization system comprising:

a main memory in which the character pattern is stored from the scanning means;

an auxiliary memory in which the character pattern is also stored from the scanning means;

sensing means arranged to sense the value of at least one spatial parameter of the character pattern in said main memory and generate at least one electrical normalization signal in response thereto; and normalization means operatively connected to said main memory and said auxiliary memory and responsive to said at least one normalization signal, said normalization means being operative to shift the character pattern from said auxiliary memory to said main memory and normalize said at least one spatial parameter in accordance with said at least one normalization signal as the character pattern is being shifted, said at least one spatial parameter including the slant of the character pattern;

said normalization means comprises a slant normalization unit which comprises gate means operative to normalize the slant of the character pattern by gating an electrical signal from a memory element of said auxiliary memory representing a point to the left of a first selected point in an upper portion of the character pattern to a memory element of said main memory representing the first selected point and gating an electrical signal from a memory element of said auxiliary memory representing a point in the character pattern to the right of a second selected point in a lower portion of the character pattern to a memory element of said memory representing the second selected point to normalize left ward slant; and said gate means being operative to gate an electrical signal from a memory element of said auxiliary memory representing a point to the right of the first selected point in the upper portion of the character pattern to the memory element of the main memory representing the first selected point and gate an electrical signal from a memory element of said auxiliary memory representing a point in the character pattern to the left of the second selected point in the lower portion of the character pattern to the memory element of the main memory representing the second selected point to normalize right ward slant.

* * * * *